United States Patent
Nakata et al.

(10) Patent No.: US 6,913,862 B2
(45) Date of Patent: Jul. 5, 2005

(54) PHENOLIC COMPOUND, NOVEL RESOL RESIN, CURED PRODUCTS THEREOF, ELECTROPHOTOGRAPHIC PHOTOSENSITIVE MEMBER CONTAINING THEM, AND PROCESS CARTRIDGE AND ELECTROPHOTOGRAPHIC APPARATUS WHICH HAVE THE ELECTROPHOTOGRAPHIC PHOTOSENSITIVE MEMBER

(75) Inventors: Kouichi Nakata, Shizuoka (JP); Yosuke Morikawa, Kanagawa (JP); Tatsuya Ikezue, Kanagawa (JP); Kimihiro Yoshimura, Kanagawa (JP); Daisuke Tanaka, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 10/321,643

(22) Filed: Dec. 18, 2002

(65) Prior Publication Data

US 2003/0175603 A1 Sep. 18, 2003

(30) Foreign Application Priority Data

Dec. 21, 2001 (JP) ........................................ 2001/389240

(51) Int. Cl.$^7$ ................................................ G03G 15/02
(52) U.S. Cl. ...................... 430/58.1; 430/58.7; 430/66; 399/262
(58) Field of Search .............................. 430/58.1, 58.7, 430/66; 399/262; 528/129

(56) References Cited

U.S. PATENT DOCUMENTS

| | | | | |
|---|---|---|---|---|
| 5,693,443 | A | * | 12/1997 | Nakamura et al. ............ 430/66 |
| 5,837,412 | A | | 11/1998 | Suzuki et al. ................... 430/59 |
| 6,010,810 | A | | 1/2000 | Uesaka et al. ............... 430/58.8 |
| 6,492,081 | B2 | | 12/2002 | Morikawa et al. ............ 430/66 |
| 6,562,530 | B2 | * | 5/2003 | Morikawa et al. ............ 430/66 |
| 6,569,586 | B2 | * | 5/2003 | Itami et al. ................ 430/58.2 |
| 2002/0045116 | A1 | | 4/2002 | Morikawa et al. ............ 430/66 |
| 2004/0063014 | A1 | | 4/2004 | Yoshimura et al. ......... 430/59.6 |

FOREIGN PATENT DOCUMENTS

| | | |
|---|---|---|
| EP | 01383009 | 1/2004 |
| JP | 57-30846 | 2/1982 |
| JP | 5-181299 | 7/1993 |
| JP | 10-228126 | 8/1998 |

* cited by examiner

*Primary Examiner*—John L. Goodrow
(74) *Attorney, Agent, or Firm*—Fitzpatrick, Cella, Harper & Scinto

(57) ABSTRACT

A phenolic compound having a plurality of substituted hydroxyphenyl groups and charge-transportable structure, the substituted hydroxyphenyl groups of which have a hydroxymethyl group; and a resol resin obtained by allowing a phenolic compound having hydroxyphenyl groups and charge-transportable structure, to react with formaldehyde in the presence of a basic catalyst, and having charge-transportable structure. Also disclosed are a cured product and an electrophotographic photosensitive member which make use of the above, and a process cartridge and an electrophotographic apparatus which have the electrophotographic photosensitive member.

42 Claims, 2 Drawing Sheets

PHENOLIC COMPOUND, NOVEL RESOL RESIN, CURED PRODUCTS THEREOF, ELECTROPHOTOGRAPHIC PHOTOSENSITIVE MEMBER CONTAINING THEM, AND PROCESS CARTRIDGE AND ELECTROPHOTOGRAPHIC APPARATUS WHICH HAVE THE ELECTROPHOTOGRAPHIC PHOTOSENSITIVE MEMBER

BACKGROUND OF THE INVENTION

1. Field of the Invention

This invention relates to a novel phenolic compound, a novel resol resin, cured products thereof, an electrophotographic photosensitive member containing them, and a process cartridge and an electrophotographic apparatus which have the electrophotographic photosensitive member.

2. Related Background Art

Compounds having a hydroxyphenyl group, what are called phenolic compounds, in particular, phenolic compounds having a hydroxymethyl group in the hydroxyphenyl group (hydroxymethyl-group-containing phenolic compounds) are known to be used in various purposes. For example, they are applied to coating materials as disclosed in D. H. Solomon, "The Chemistry of Organic Film Formers", and besides they are used in many fields such as lithographic printing plates, photoresists, adhesives, molding materials, laminating materials and binding agents. In these uses, specifically often used are phenol-formalin-resol resins and compounds such as bishydroxymethyl-p-cresol and tetrakishydroxymethylbisphenol-A.

However, such known hydroxymethyl-group-containing phenolic compounds and phenol-formalin-resol resins have by no means been those having any charge-transportable structure in the molecule. Also, they both have so few hydroxymethyl groups in the molecule that any sufficient hard-film performance has not been achievable when used in coating materials, photosensitive printing plates or the like. In order to make them satisfy such hard-film performance, it has been necessary to add the hydroxymethyl-group-containing phenolic compound or resol resin in a large quantity.

Any compound does not yet exist which has in the same molecule the charge-transportable structure and the hydroxymethyl-group-containing hydroxyphenyl group and also can form a three-dimensionally cross-linked structure alone upon heating to provide a strong cured product.

In recent years, research and development are energetically made on organic electrophotographic photosensitive members making use of organic photoconductive materials in view of advantages that they have a high safety, have a superior productivity and are inexpensive. Invention has hitherto been made thereon in a great deal, and has been put into practical use. However, electrophotographic photosensitive members composed chiefly of a photoconductive polymer typified by poly-N-vinyl carbazole and a charge transfer complex formed of 2,4,7-trinitrofluorenone or the like have not necessarily been satisfactory in view of sensitivity, durability, residual potential and so forth.

Function-separated electrophotographic photosensitive members in which the function of charge generation and the function of charge transport are allotted to respectively different materials have also brought about remarkable improvement in sensitivity and durability which have been considered disadvantageous in conventional organic electrophotographic photosensitive members.

The function-separated electrophotographic photosensitive members have also advantages that charge-generating materials and charge-transporting materials are both available in wide ranges of material selection and that electrophotographic photosensitive members with desired characteristics can be produced relatively with ease.

As the charge-generating materials, various azo pigments, polycyclic quinone pigments, phthalocyanine pigments, cyanine dyes, squalic acid dyes, pyrylium salt dyes and so forth are known in the art. Also, as the charge-transporting materials, pyrazoline compounds, hydrazone compounds, triphenylamine compounds and so froth are known in the art.

Now, with achievement of high image quality and high-speed and high-durability image formation in recent years, the organic electrophotographic photosensitive members are also required to be more improved in mechanical durability.

In recent years, electrophotographic apparatus such as printers, copying machines and facsimile machines making use of electrophotographic photosensitive members have also come into wide use in various fields, and are more severely required to provide images which are always stable even in more various environments, and the electrophotographic photosensitive members have come to have a high possibility of being exposed to chemical, electrical and mechanical impact against its surface characteristics. Accordingly, requirements for surface layers have come severer.

Electrophotographic photosensitive members, to which electrical and mechanical external forces are directly applied, are required to have durabilities to such forces. Stated specifically, they are required to have durability to the occurrence of surface wear and scratches due to friction and durability to the deterioration of surface layer that is caused by adhesion of active substances such as ozone and nitrogen oxides generated at the time of charging.

In addition, electrophotographic photosensitive members are repeatedly put to the steps of charging, exposure, development, transfer, cleaning and charge elimination. Electrostatic latent images formed upon charging and exposure are made into toner images by the use of a particulate developer called a "toner". The toner images are further transferred to a transfer material such as paper by a transfer means, where it is not that the toner of the toner images is all transferred but that it remains partly on the surface of the photosensitive member as a residual toner.

If this residual toner is in a large quantity, the images on the transfer material come into images with what is called "crumbling blank areas". This not only results in lack of image uniformity but also may cause a problem that the melt adhesion of toner or filming occurs on the electrophotographic photosensitive member. To solve such a problem, it is required to improve the releasability of the surface layer of the electrophotographic photosensitive member.

To meet such requirements, it has been attempted to provide protective layers of various types. Among various attempts, protective layers composed chiefly of resins have been proposed in a large number. For example, in Japanese Patent Application Laid-open No. 57-30846, a protective layer is disclosed which is formed of a resin to which a metal oxide is added as conductive particles so that its volume resistivity can be controlled. Japanese Patent Application Laid-open No. 5-181299 also discloses use of a curable phenolic resin as a resin for protective layers. Japanese Patent Application Laid-open No. 5-181299 and so forth further discloses an example in which a phenolic resin is used as a binder resin for surface layers.

Under existing circumstances, however, even these protective or surface layers have not achieved any durability, releasability and so forth against various impact to surface and against wear and scratching, which are properties well satisfactory as protective layers.

The achievement of an electrophotographic photosensitive member having high durability and less abrasion level may also result in a lowering of surface resistance of the electrophotographic photosensitive member, caused by adhesion of charge products or paper dust. This is remarkable especially in an environment of high temperature and high humidity. These have brought about an additional problem that streaky blurred images, what is called "smeared images", may occur in the rotational direction of the electrophotographic photosensitive member.

Highly durable electrophotographic photosensitive members having excellent stability to environmental variations do not yet have any sufficient performance.

SUMMARY OF THE INVENTION

An object of the present invention is to provide a novel phenolic compound and a novel resol resin, in particular, a novel phenolic compound and a novel resol resin which are able to endow electrophotographic photosensitive members with excellent properties (surface properties) to improve durability to the occurrence of wear and scratches, lessen residual-potential increase and potential variations, and maintain high-grade image quality over a long period of time, and also provide cured products thereof.

Another object of the present invention is to provide an electrophotographic photosensitive member having a surface layer containing the above novel phenolic compound or novel resol resin, i.e., an electrophotographic photosensitive member which has a high durability to the occurrence of wear and scratches, has small residual-potential increase and potential variations, can maintain high-grade image quality over a long period of time and, even in electrophotographic photosensitive members having been made highly durable, does not cause any smeared images when used over a long period of time in an environment of high temperature and high humidity; and a process cartridge and an electrophotographic apparatus which have such an electrophotographic photosensitive member.

That is, the present invention is a phenolic compound comprising a compound having a plurality of substituted hydroxyphenyl groups and charge-transportable structure;

at least one of the substituted hydroxyphenyl groups having at least one hydroxymethyl group as a substituent.

The present invention is also a resol resin comprising a resin obtained by allowing a phenolic compound having hydroxyphenyl groups and charge-transportable structure, to react with formaldehyde in the presence of a basic catalyst;

the resin having charge-transportable structure.

The present invention is still also a cured product of a phenolic compound, comprising a cured product obtained by curing a phenolic compound having a hydroxymethyl group, wherein;

the phenolic compound is a phenolic compound having a plurality of substituted hydroxyphenyl groups and charge-transportable structure;

at least one of the substituted hydroxyphenyl groups having at least one hydroxymethyl group as a substituent.

The present invention is further a cured product of a resol resin, comprising a cured product obtained by curing a resol resin, wherein;

the resol resin is a resol resin obtained by allowing a phenolic compound having hydroxyphenyl groups and charge-transportable structure, to react with formaldehyde in the presence of a basic catalyst;

the resol resin having charge-transportable structure.

The present invention is still further an electrophotographic photosensitive member comprising a support and provided thereon a photosensitive layer, wherein;

the electrophotographic photosensitive member has a surface layer which contains a cured product of a phenolic compound having a plurality of substituted hydroxyphenyl groups and charge-transportable structure;

at least one of the substituted hydroxyphenyl groups having at least one hydroxymethyl group as a substituent.

The present invention is still further an electrophotographic photosensitive member comprising a support and provided thereon a photosensitive layer, wherein;

the electrophotographic photosensitive member has a surface layer which contains a cured product of a resol resin obtained by allowing a phenolic compound having hydroxyphenyl groups and charge-transportable structure, to react with formaldehyde in the presence of a basic catalyst;

the resol resin having charge-transportable structure.

The present invention is still further a process cartridge comprising an electrophotographic photosensitive member and at least one means selected from the group consisting of a charging means, a developing means, a transfer means and a cleaning means which are integrally supported, and being detachably mountable to the main body of an electrophotographic apparatus, wherein;

the electrophotographic photosensitive member is an electrophotographic photosensitive member comprising a support and provided thereon a photosensitive layer;

the electrophotographic photosensitive member having a surface layer which contains a cured product of a phenolic compound having a plurality of substituted hydroxyphenyl groups and charge-transportable structure;

at least one of the substituted hydroxyphenyl groups having at least one hydroxymethyl group as a substituent.

The present invention is still further a process cartridge comprising an electrophotographic photosensitive member and at least one means selected from the group consisting of a charging means, a developing means, a transfer means and a cleaning means which are integrally supported, and being detachably mountable to the main body of an electrophotographic apparatus, wherein;

the electrophotographic photosensitive member is an electrophotographic photosensitive member comprising a support and provided thereon a photosensitive layer;

the electrophotographic photosensitive member having a surface layer which contains a cured product of a resol resin obtained by allowing a phenolic compound having hydroxyphenyl groups and charge-transportable structure, to react with formaldehyde in the presence of a basic catalyst;

the resol resin having charge-transportable structure.

The present invention is still further an electrophotographic apparatus comprising an electrophotographic photosensitive member, a charging means, an exposure means, a developing means and a transfer means, wherein;

the electrophotographic photosensitive member is an electrophotographic photosensitive member comprising a support and provided thereon a photosensitive layer;

the electrophotographic photosensitive member having a surface layer which contains a cured product of a phenolic compound having a plurality of substituted hydroxyphenyl groups and charge-transportable structure;

at least one of the substituted hydroxyphenyl groups having at least one hydroxymethyl group as a substituent.

The present invention is still further an electrophotographic apparatus comprising an electrophotographic photosensitive member, a charging means, an exposure means, a developing means and a transfer means, wherein;

the electrophotographic photosensitive member is an electrophotographic photosensitive member comprising a support and provided thereon a photosensitive layer;

the electrophotographic photosensitive member having a surface layer which contains a cured product of a resol resin obtained by allowing a phenolic compound having hydroxyphenyl groups and charge-transportable structure, to react with formaldehyde in the presence of a basic catalyst;

the resol resin having charge-transportable structure.

DESCRIPTION OF THE PREFERRED EMBODIMENTS

Figure 1A:
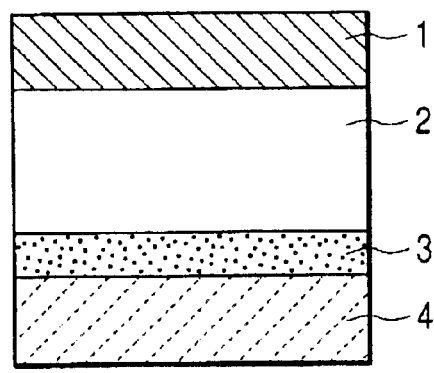
FIGS. 1A, 1B and 1C each illustrate the layer construction of the electrophotographic photosensitive member of the present invention.

The present invention is described below in greater detail.

The novel phenolic compound of the present invention is a phenolic compound having charge-transportable structure, which is characterized by having a plurality of substituted hydroxyphenyl groups and charge-transportable structure.

The phenolic compound having hydroxyphenyl groups and charge-transportable structure is meant to be a compound having in the same molecule, together with a plurality of hydroxyphenyl groups, a structure having the function to transport electric charges (charge-transportable structure) such as a triarylamine structure, a stilbene structure, a hydrazone structure, a pyrazoline structure and a triphenylmethane structure. Among these charge-transportable structures, a triarylamine structure is preferred.

The novel phenolic compound of the present invention is, among phenolic compounds having hydroxyphenyl groups and charge-transportable structure, a phenolic compound in which at least one of the hydroxyphenyl groups the compound has is a hydroxyphenyl group having a hydroxymethyl group as a substituent (i.e., a hydroxymethyl-group-containing phenolic compound).

Incidentally, in the present invention, hydroxyphenyl groups having a substituent is expressed as substituted hydroxyphenyl groups. Among the substituted hydroxyphenyl groups, groups having a hydroxymethyl group as the substituent are expressed as hydroxymethyl-group-containing hydroxyphenyl groups.

Among the hydroxyphenyl groups (inclusive of substituted hydroxyphenyl groups), what is called p-hydroxyphenyl groups are preferred whose phenyl groups and other moiety skeleton are linked at the position which is the p-position as viewed from the hydroxy groups.

Among the hydroxymethyl-group-containing hydroxyphenyl groups, hydroxymethyl-group-containing hydroxyphenyl groups are preferred at least one of the hydroxymethyl groups of which is linked at the position which is the o-position in respect to any of the hydroxyl groups in the hydroxymethyl-group-containing hydroxyphenyl groups.

Stated further, among the above novel phenolic compounds of the present invention, more preferred is a hydroxymethyl-group-containing phenolic compound having structure represented by any one of the following Formulas (1) to (5).

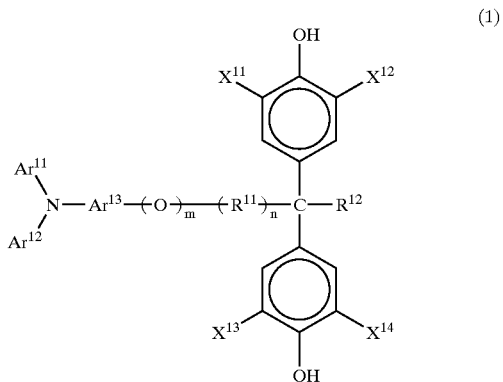

(1)

In Formula (1), $R^{11}$ represents a divalent hydrocarbon group having 1 to 8 carbon atoms and which may be branched. $R^{12}$ represents a hydrogen atom, a substituted or unsubstituted alkyl group, a substituted or unsubstituted aralkyl group or a substituted or unsubstituted phenyl group. $Ar^{11}$ and $Ar^{12}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group. $Ar^{13}$ represents a substituted or unsubstituted divalent aromatic hydrocarbon ring group or a substituted or unsubstituted divalent aromatic heterocyclic group. Letter symbols m and n are each independently 0 or 1. $X^{11}$ to $X^{14}$ each independently represent a hydrogen atom or a hydroxymethyl group, provided that at least one of $X^{11}$ to $X^{14}$ is a hydroxymethyl group.

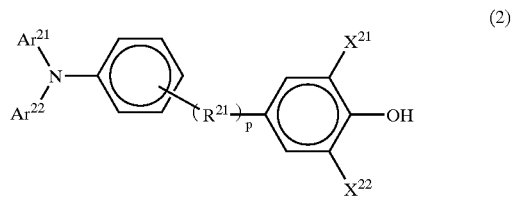

(2)

In Formula (2), $R^{21}$ represents a divalent hydrocarbon group having 1 to 8 carbon atoms and which may be branched.

$Ar^{21}$ and $Ar^{22}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group. The two benzene rings may combine to form a ring via $R^{21}$. A letter symbol p is 0 or 1. $X^{21}$ and $X^{22}$ each independently represent a hydrogen atom or a hydroxymethyl group, provided that at least one of $X^{21}$ and $X^{22}$ is a hydroxymethyl group.

(3)

In Formula (3), $R^{31}$ and $R^{32}$ each independently represent a divalent hydrocarbon group having 1 to 8 carbon atoms and which may be branched. $Ar^{31}$ represents a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group. The two benzene rings linked via $R^{31}$ may combine to form a ring via $R^{31}$. The two benzene rings linked via $R^{32}$ may combine to form a ring via $R^{32}$. Letter symbols q and r are each independently 0 or 1. $X^{31}$ to $X^{34}$ each independently represent a hydrogen atom or a hydroxymethyl group, provided that at least one of $X^{31}$ to $X^{34}$ is a hydroxymethyl group.

(4)

In Formula (4), $R^{41}$ to $R^{43}$ each independently represent a divalent hydrocarbon group having 1 to 8 carbon atoms and which may be branched. The two benzene rings linked via $R^{41}$ may combine to form a ring via $R^{41}$. The two benzene rings linked via $R^{42}$ may combine to form a ring via $R^{42}$. The two benzene rings linked via $R^{43}$ may combine to form a ring via $R^{43}$. Letter symbols s, t and u are each independently 0 or 1. $X^{41}$ to $X^{46}$ each independently represent a hydrogen atom or a hydroxymethyl group, provided that at least one of $X^{41}$ to $X^{46}$ is a hydroxymethyl group.

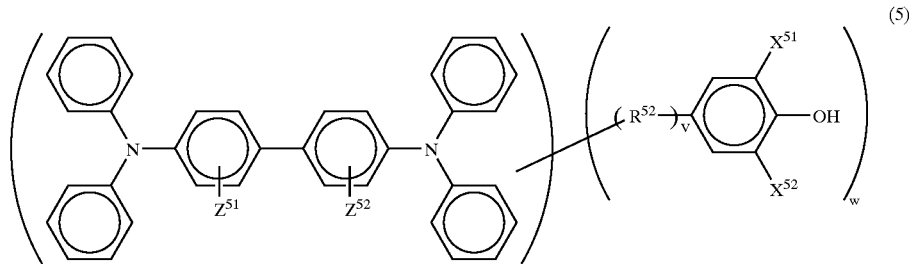

(5)

In Formula (5), $R^{52}$ represents a divalent hydrocarbon group having 1 to 8 carbon atoms and which may be branched. $Z^{51}$ and $Z^{52}$ each independently represent a hydrogen atom, a halogen atom, a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group. The benzene ring having $Z^{51}$ and the benzene ring having $Z^{52}$ may combine via $Z^{51}$ or $Z^{52}$ to form a ring. A letter symbol v is 0 or 1. A letter symbol w is an integer of 1 to 4. $X^{51}$ and $X^{52}$ each independently represent a hydrogen atom or a hydroxymethyl group, provided that at least one of $X^{51}$ and $X^{52}$ is a hydroxymethyl group.

The novel resol resin of the present invention is, as described previously, a resol resin obtained by allowing a phenolic compound having hydroxyphenyl groups and charge-transportable structure, to react with formaldehyde in the presence of a basic catalyst, and is a resol resin having charge-transportable structure.

The charge-transportable structure may include, like the above hydroxymethyl-group-containing phenolic compound of the present invention, a triarylamine structure, a stilbene structure, a hydrazone structure, a pyrazoline structure and a triphenylmethane structure. Among these, a triarylamine structure is preferred.

The hydroxyphenyl groups of the phenolic compound serving as a raw material of the resol resin has may also preferably be a p-hydroxyphenyl group.

Among phenolic compounds having hydroxyphenyl groups and charge-transportable structure, serving as raw materials of the resol resin of the present invention, more preferred is a phenolic compound having structure represented by any one of the following Formulas (6) to (10) is preferred.

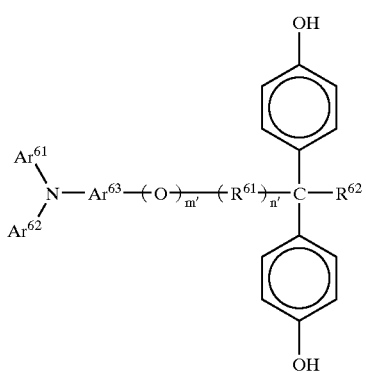

(6)

In Formula (6), $R^{61}$ represents a divalent hydrocarbon group having 1 to 8 carbon atoms and which may be branched. $R^{62}$ represents a hydrogen atom, a substituted or unsubstituted alkyl group, a substituted or unsubstituted aralkyl group or a substituted or unsubstituted phenyl group. $Ar^{61}$ and $Ar^{62}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group. $Ar^{63}$ represents a substituted or unsubstituted divalent aromatic hydrocarbon ring group or a substituted or unsubstituted divalent aromatic heterocyclic group. Letter symbols m' and n' are each independently 0 or 1.

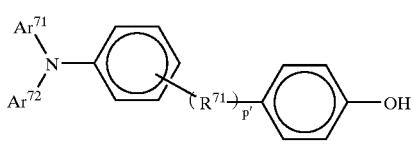

(7)

In Formula (7), $R^{71}$ represents a divalent hydrocarbon group having 1 to 8 carbon atoms and which may be branched. $Ar^{71}$ and $Ar^{72}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group. The two benzene rings may combine to form a ring via $R^{71}$. A letter symbol p' is 0 or 1.

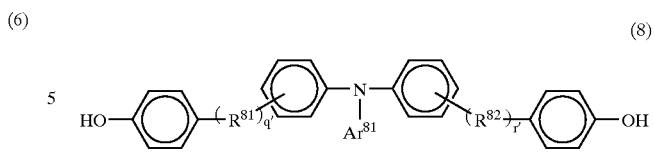

(8)

In Formula (8), $R^{81}$ and $R^{82}$ each independently represent a divalent hydrocarbon group having 1 to 8 carbon atoms and which may be branched. $Ar^{81}$ represents a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group. The two benzene rings linked via $R^{81}$ may combine to form a ring via $R^{81}$. The two benzene rings linked via $R^{82}$ may combine to form a ring via $R^{82}$. Letter symbols q' and r' are each independently 0 or 1.

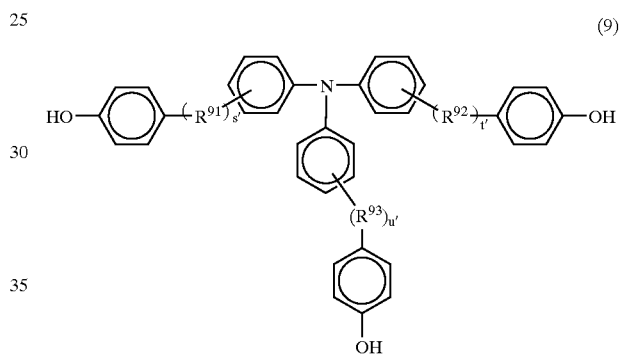

(9)

In Formula (9), $R^{91}$ to $R^{93}$ each independently represent a divalent hydrocarbon group having 1 to 8 carbon atoms and which may be branched. The two benzene rings linked via $R^{91}$ may combine to form a ring via $R^{91}$. The two benzene rings linked via $R^{92}$ may combine to form a ring via $R^{92}$. The two benzene rings linked via $R^{93}$ may combine to form a ring via $R^{93}$. Letter symbols s', t' and u' are each independently 0 or 1.

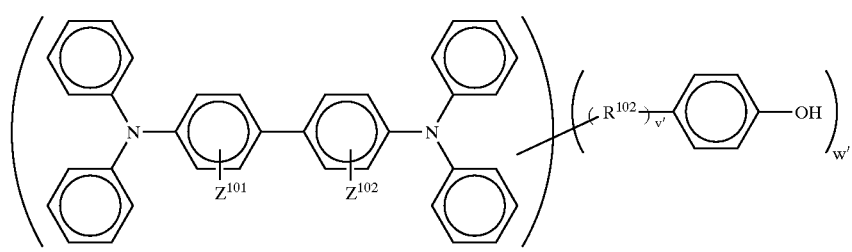

(10)

In Formula (10), $R^{102}$ represents a divalent hydrocarbon group having 1 to 8 carbon atoms and which may be branched. $Z^{101}$ and $Z^{102}$ each independently represent a hydrogen atom, a halogen atom, a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group. The benzene ring having $Z^{101}$ and the benzene ring having $Z^{102}$ may combine via $Z^{101}$ or $Z^{102}$ to form a ring. A letter symbol v' is 0 or 1. A letter symbol w' is an integer of 1 to 4.

Structures such as the substituents in the above Formulas (1) to (10) are described below.

The divalent hydrocarbon groups having 1 to 8 carbon atoms and which may be branched may include a methylene group, an ethylene group, a propylene group and a butylene group.

The alkyl group may include a methyl group, an ethyl group, a propyl group and a butyl group. The aralkyl group may include a benzyl group, a phenethyl group and a naphthylmethyl group. The monovalent aromatic hydrocarbon ring group may include a phenyl group, a naphthyl group, an anthryl group and a pyrenyl group. The monovalent aromatic heterocyclic group may include a pyridyl group, a thienyl group, a furyl group and a quinolyl group.

The divalent aromatic hydrocarbon ring group may include a phenylene group, a naphthylene group, an anthrylene group and a pyrenylene group. The divalent aromatic heterocyclic group may include a pyridilene group and a thienylene group.

The halogen atom may include a fluorine atom, a chlorine atom, a bromine atom and an iodine atom.

In the case in which the benzene ring having $Z^{51}$ or $Z^{101}$ and the benzene ring having $Z^{52}$ or $Z^{101}$ combine via $Z^{51}$ or $Z^{52}$ or $Z^{101}$ or $Z^{102}$, respectively, to form a ring, the ring may specifically include cyclic structures such as a fluorene skeleton and a dihydrophenanthrene skeleton.

The substituents the above groups may have may include alkyl groups such as a methyl group, an ethyl group, a propyl group and a butyl group; aralkyl groups such as a benzyl group, a phenethyl group and a naphthylmethyl group; monovalent aromatic hydrocarbon ring groups such as a phenyl group, a naphthyl group, an anthryl group, a pyrenyl group, a fluorenyl group, a carbazolyl group, a dibenzofuryl group and a dibenzothiophenyl; alkoxyl groups such as a methoxyl group, an ethoxyl group and a propoxyl group; aryloxyl groups such as a phenoxyl group and a naphthoxyl group; halogen atoms such as a fluorine atom, a chlorine atom, a bromine atom and an iodine atom; and a nitro group and a cyano group.

The hydroxymethyl-group-containing phenolic compound of the present invention is obtained by allowing the phenolic compound having hydroxyphenyl groups and charge-transportable structure to react with formaldehyde in the presence of a basic catalyst to introduce at least one hydroxymethyl group into the hydroxyphenyl group of the phenolic compound.

The phenolic compound having hydroxyphenyl groups and charge-transportable structure and the formaldehyde may preferably be fed in a molar ratio of from. 1:2 to 1:30, and more preferably from 1:6 to 1:18 from the viewpoint of yield.

The reaction may preferably be carried out at a temperature of from 0° C. to 80° C., and more preferably from 10° C. to 60° C. At a temperature lower than 0° C., the reaction may proceed slowly. At a temperature higher than 80° C., gelation may occur. The reaction time may vary depending on the reaction temperature. For example, in the case of 40° C., the reaction may preferably be carried out for 4 hours to 10 days, and more preferably for 12 hours to 5 days.

Usually, the reaction of the phenolic compound with the formaldehyde takes place predominantly at the o-position or p-position as viewed from the hydroxyl groups of the hydroxyphenyl groups. Where the hydroxyphenyl groups are p-hydroxyphenyl groups, the addition of hydroxymethyl groups derived from the formaldehyde often takes place on the o-position. However, the addition may take place on the m-position in side reaction or the like.

The resol resin of the present invention, having charge-transportable structure, may also be obtained by the same method as the synthesis of the above hydroxymethyl-group-containing phenolic compound of the present invention, having charge-transportable structure.

In the present invention, the resol resin refers to a mixture which is in the state the degree of introduction of hydroxymethyl groups and the intermolecular condensation product are appropriately set by arbitrarily controlling hydroxymethylation reaction to freely change the mixing ratio of hydroxymethyl groups and the molecular weight distribution. Hence, intentionally or unintentionally the resol resin contains not only monomers but also oligomers, and has broader composition than the phenolic compound.

The resol resin may contain not only a monomer structure but also an oligomer such as a dimer or a trimer as exemplified later. Hydroxymethyl groups formed in the middle of hydroxymethylation reaction further cause condensation or addition reaction such as dehydration or removal of formaldehyde at hydroxymethyl groups each other or at other sites on the hydroxyphenyl groups to form linkages between molecules to come into an oligomer.

The phenolic compound having hydroxyphenyl groups and charge-transportable structure and the formaldehyde may be fed, as a preferably range, in the same molar ratio as the case of synthesizing the above hydroxymethyl-group-containing phenolic compound having charge-transportable structure of the present invention.

The basic catalyst may preferably be used in an amount of from 5 mol % to 300 mol % based on the phenolic compound having hydroxyphenyl groups and charge-transportable structure. This basic catalyst has also the action to dissolve in an aqueous reaction solvent the phenolic compound having hydroxyphenyl groups and charge-transportable structure, and may appropriately be used in a quantity made large or small according to the solvent to be used.

The reaction may preferably be carried out at a temperature of from 0° C. to 80° C., and more preferably from 10° C. to 60° C. At a temperature lower than 0° C., the reaction may proceed slowly. At a temperature higher than 80° C., gelation may occur. The reaction time may vary depending on the reaction temperature. For example, in the case of 50° C., the reaction may preferably be carried out for 2 hours to 5 days. In this case, any reaction carried out for too long time may cause gelation.

The resol resin having charge-transportable structure of the present invention may also contain those in which the hydroxymethyl-group-containing phenolic compound having charge-transportable structure of the present invention has come into an oligomer because of the condensation of hydroxymethyl groups and the like.

As the formaldehyde used when the hydroxymethyl-group-containing phenolic compound having charge-transportable structure or resol resin having charge-transportable structure of the present invention, either of formalin and paraformaldehyde may be used.

As the basic catalyst used when the hydroxymethyl-group-containing phenolic compound having charge-transportable structure or resol resin having charge-transportable structure of the present invention, any known organic base or inorganic basic catalyst may be used.

As the organic basic catalyst, amine catalysts such as ammonia (water), tetramethylammonium hydroxide, tetraethylammonium hydroxide, triethylamine, diethylamine, monoethylamine, trimethylamine, dimethylamine, monomethylamine, morpholine and N-methylmorpholine are preferred. In particular, tertiary alkylamines are more preferred.

As the inorganic basic catalyst, catalysts containing alkali metals or alkaline earth metals, such as sodium hydroxide, potassium hydroxide, lithium hydroxide and calcium hydroxide are preferred.

The cured product of the phenolic compound described above and cured product of the resol resin described above, of the present invention, is in the state that, like what is meant by commonly available cured products, monomers or oligomers have caused reaction such as condensation or addition by means of functional groups to form a three-dimensionally polymeric network, and the product can be considered to have cured where it turns insoluble in solvents in which it had been soluble before it cures.

Where the hydroxymethyl-group-containing phenolic compound having charge-transportable structure or resol resin having charge-transportable structure of the present invention is used in a surface layer of the electrophotographic photosensitive member, a cured composition obtained from the phenolic compound or resol resin may have a low resistance if the basic catalyst and any salt formed by neutralizing it remain in the cured composition. This may cause a lowering of image quality of electrophotographic images especially in an environment of high temperature and high humidity. Accordingly, it is preferable for the product to pass through the step of removing the basic catalyst after the hydroxymethyl-group-containing phenolic compound having charge-transportable structure or resol resin having charge-transportable structure of the present invention has been obtained.

The basic catalyst may preferably be neutralized with an acid after the reaction has been completed. As the acid to be used, either of inorganic acids such as sulfuric acid, hydrochloric acid, nitric acid and phosphoric acid and organic acids such as benzenesulfonic acid, p-toluenesulfonic acid and acetic acid may be used. Salts produced through such a neutralization step may further preferably be removed by, e.g., repeating washing with water.

Where the basic catalyst is an amine catalyst, it can be removed under reduced pressure after the reaction has been completed. In that case, tertiary amines are most readily removable.

Where the hydroxymethyl-group-containing phenolic compound having charge-transportable structure is one having crystallizability, any common step of purification such as recrystallization and reprecipitation may be provided to remove the catalyst.

Next, specific examples of the phenolic compound having hydroxyphenyl groups and charge-transportable structure, used to obtain the hydroxymethyl-group-containing phenolic compound having charge-transportable structure or resol resin having charge-transportable structure of the present invention are shown below. Note that the present invention is by no means limited to these specific examples.

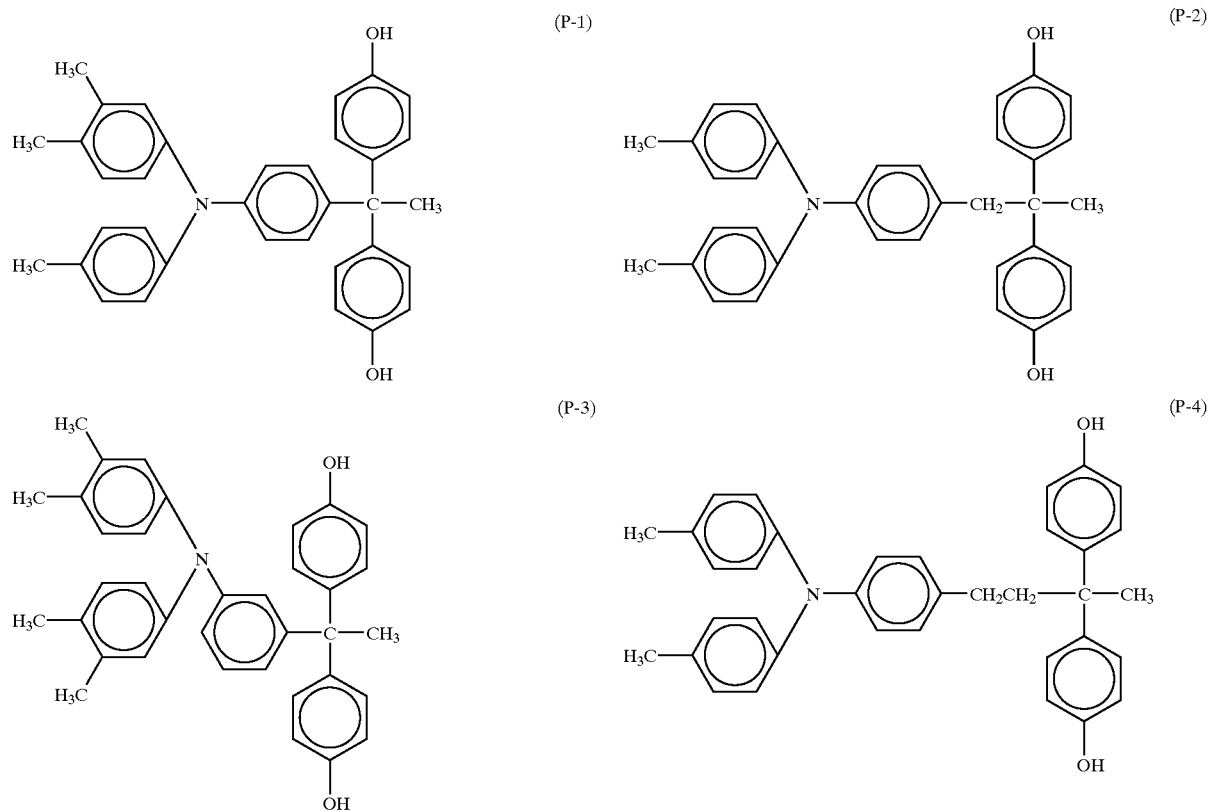

-continued
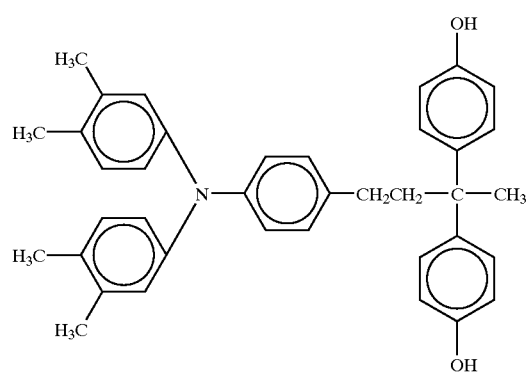
(P-5)
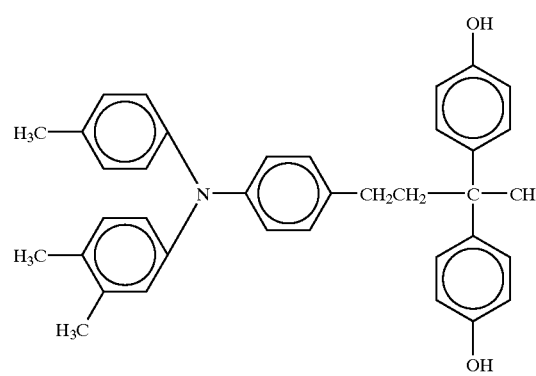
(P-6)
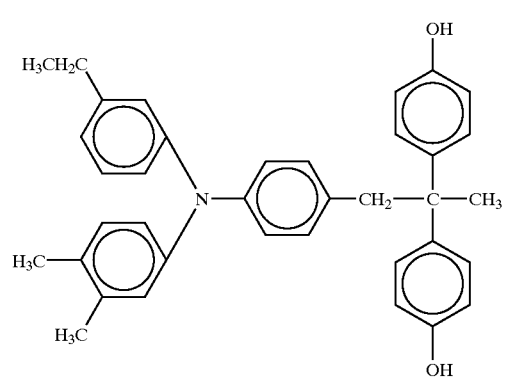
(P-7)
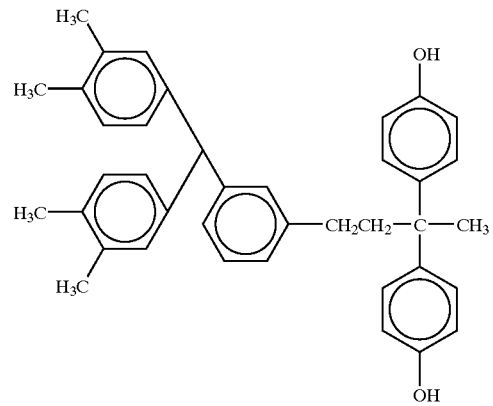
(P-8)
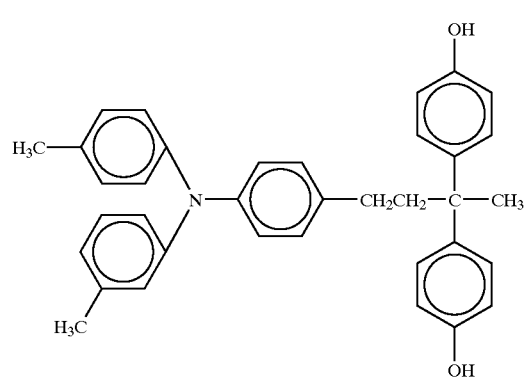
(P-9)
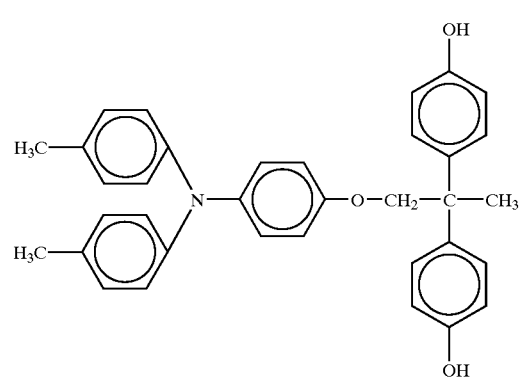
(P-10)
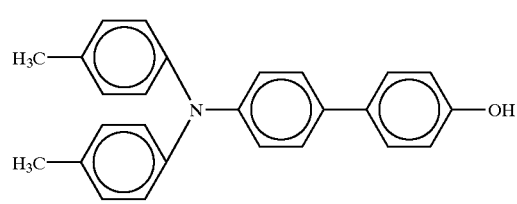
(P-11)
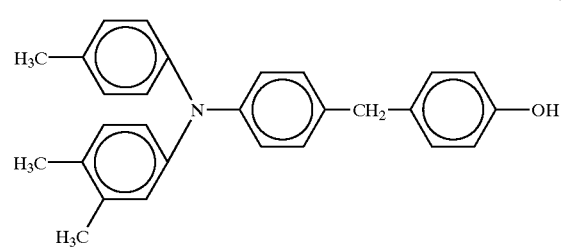
(P-12)

(P-13)
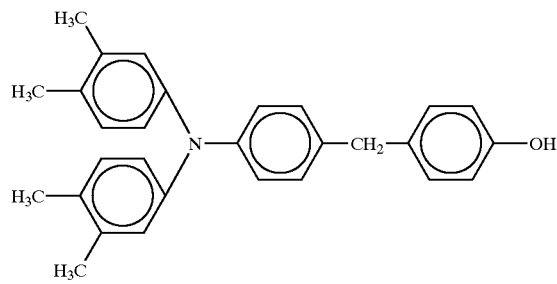
(P-14)
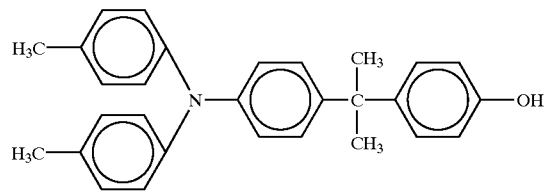
(P-15)
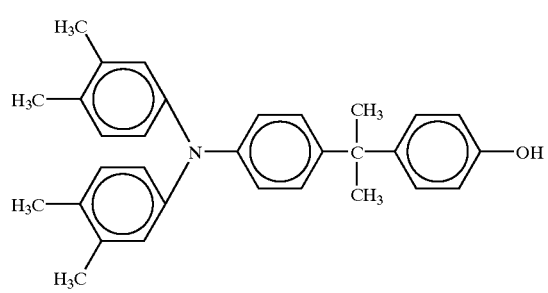
(P-16)
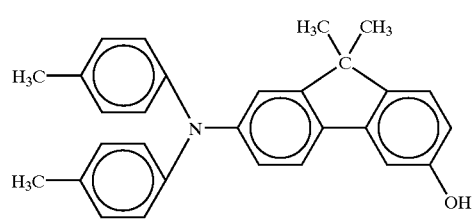
(P-17)
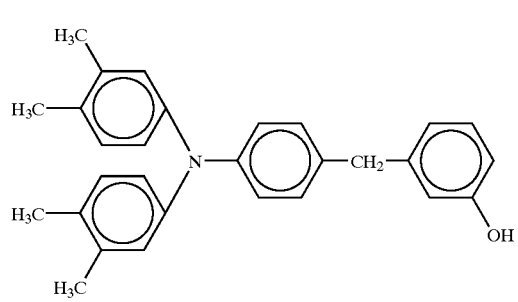
(P-18)
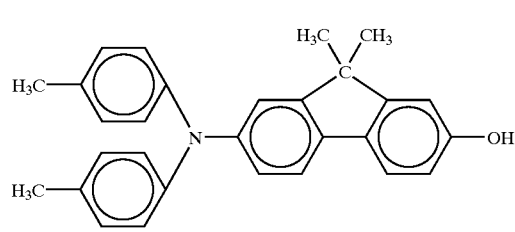
(P-19)
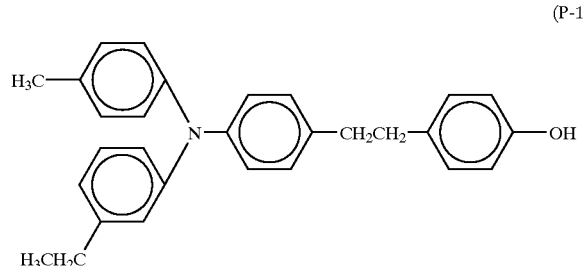
(P-20)
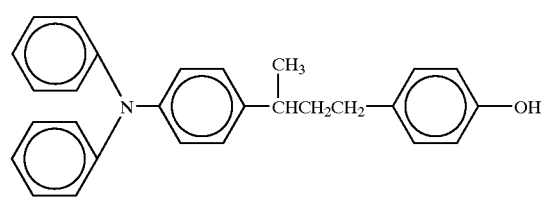
(P-21)
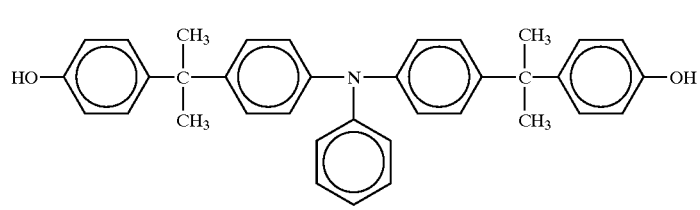
(P-22)
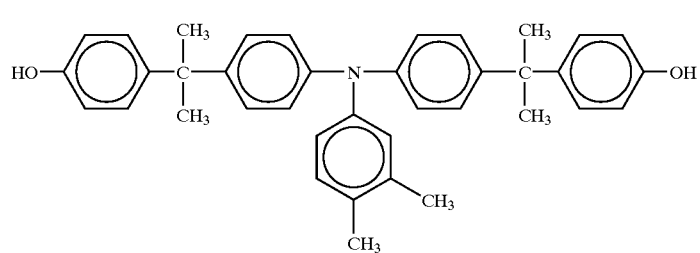

-continued
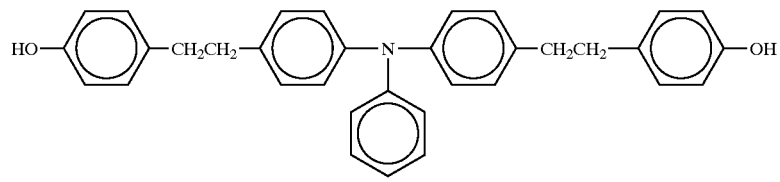
(P-23)
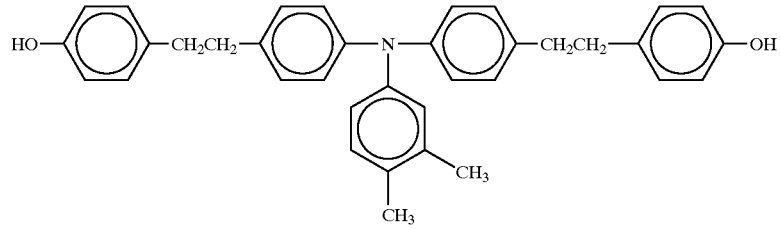
(P-24)
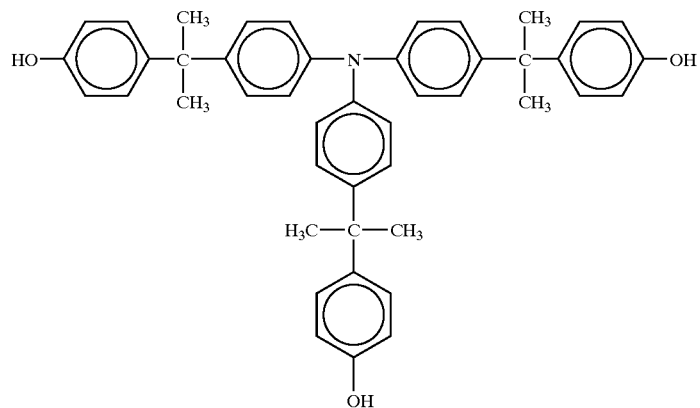
(P-25)
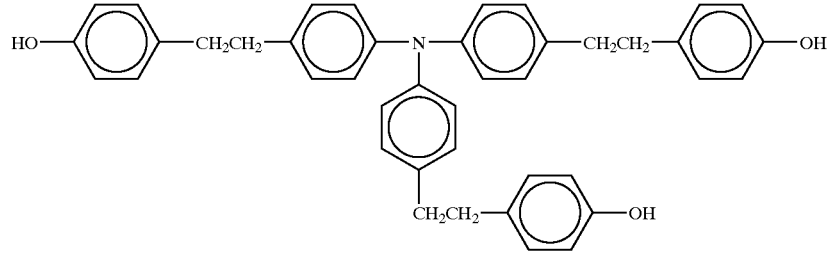
(P-26)
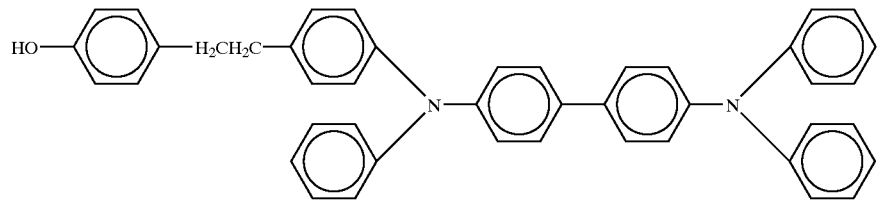
(P-27)
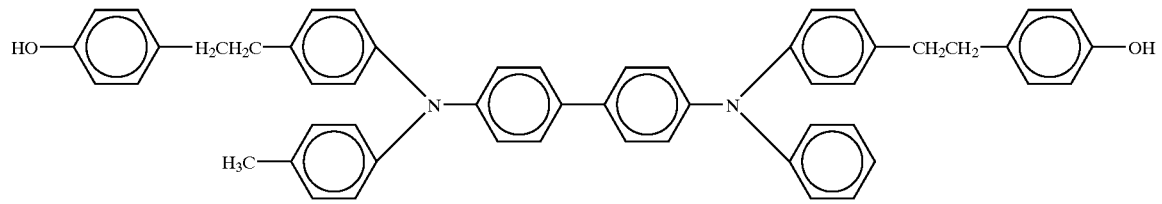
(P-28)

-continued
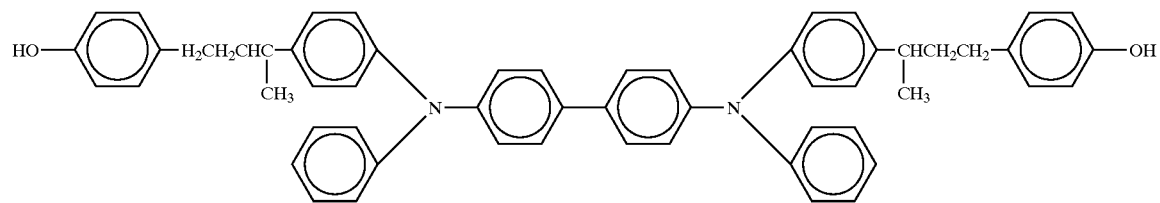
(P-29)
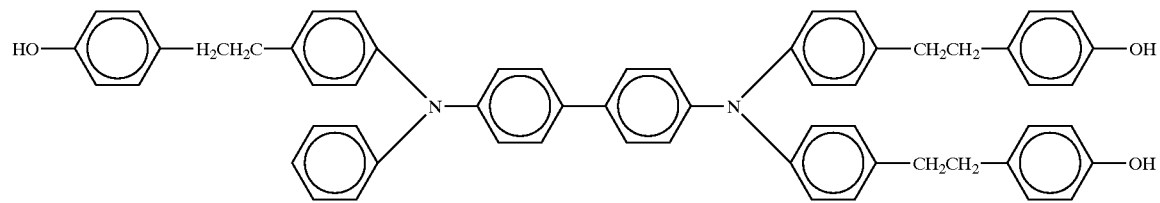
(P-30)
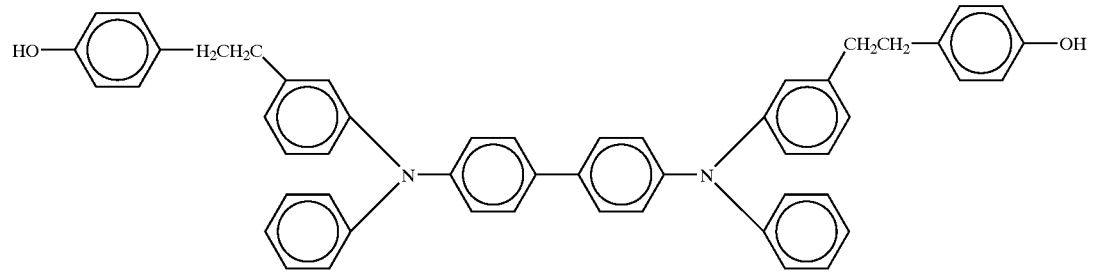
(P-31)
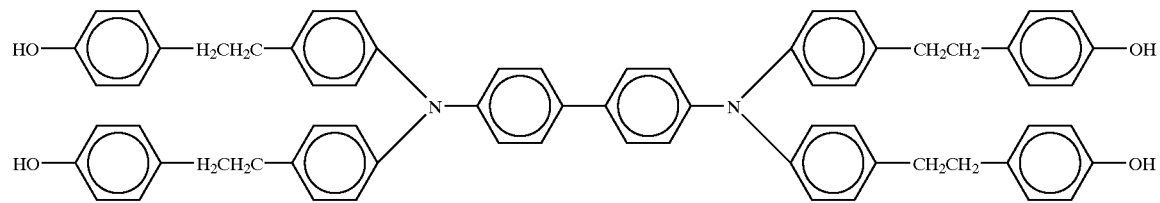
(P-32)
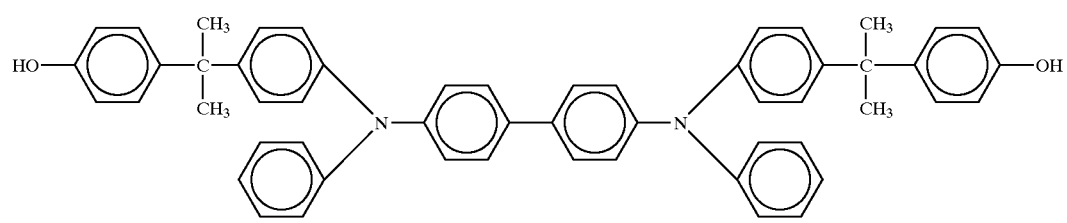
(P-33)
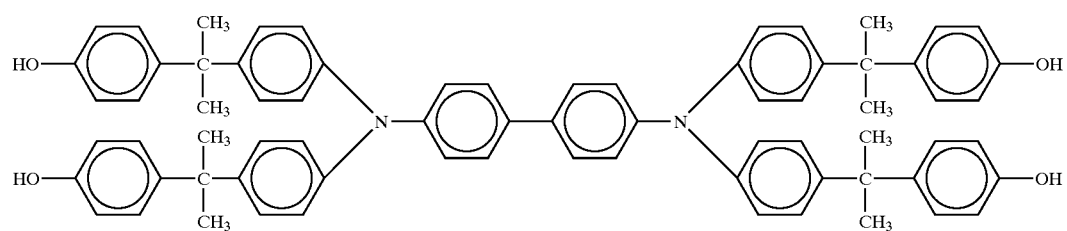
(P-34)

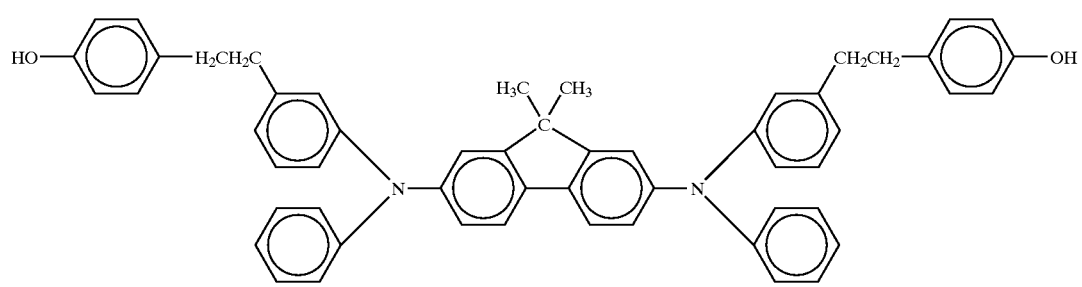
(P-35)
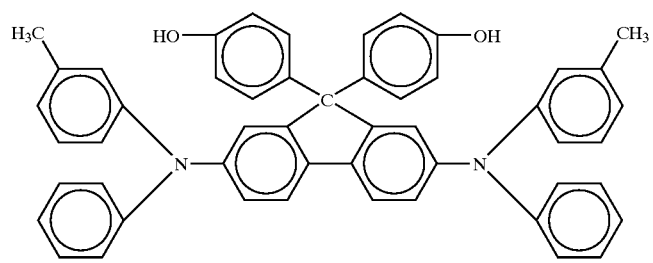
(P-36)
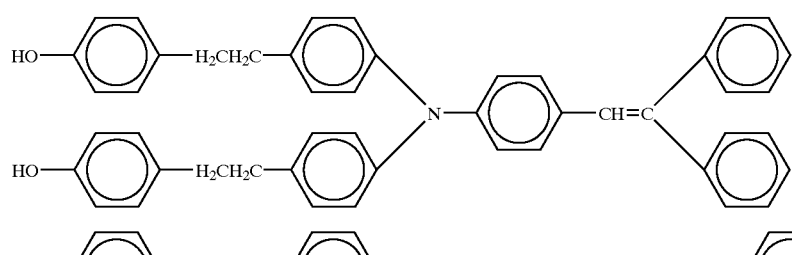
(P-37)
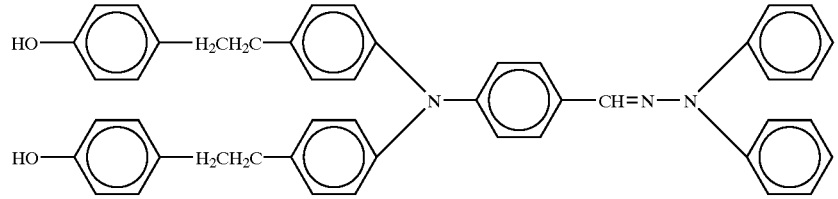
(P-38)
Next, specific examples of the hydroxymethyl-group-containing phenolic compound having charge-transportable structure of the present invention are shown below. Note that the present invention is by no means limited to these specific examples.
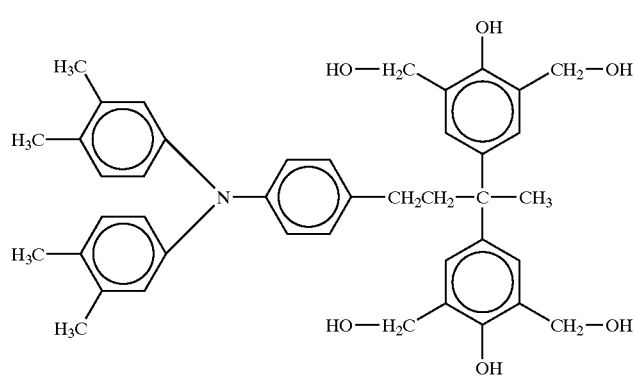
(HP-5)

-continued
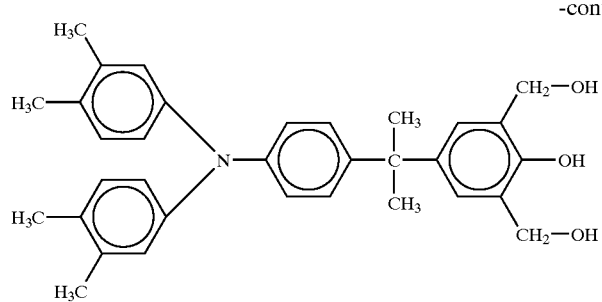
(HP-15)
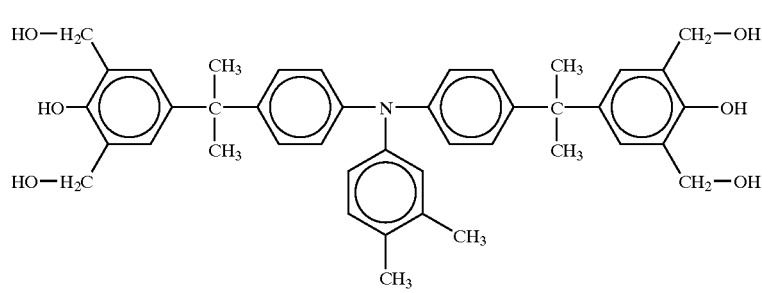
(HP-22)
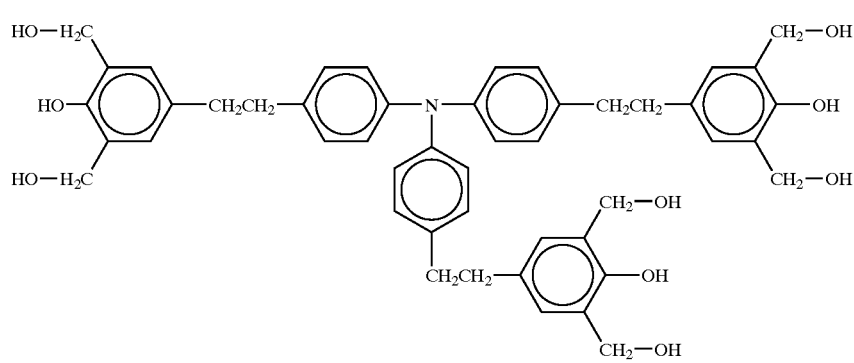
(HP-26)
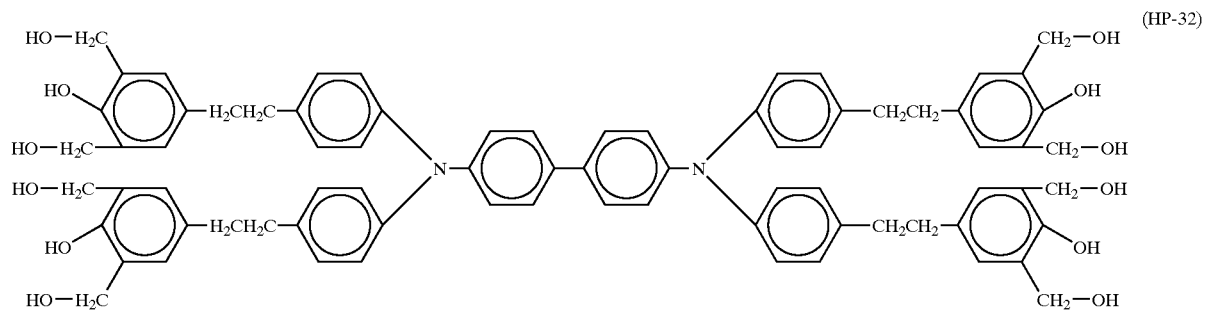
(HP-32)
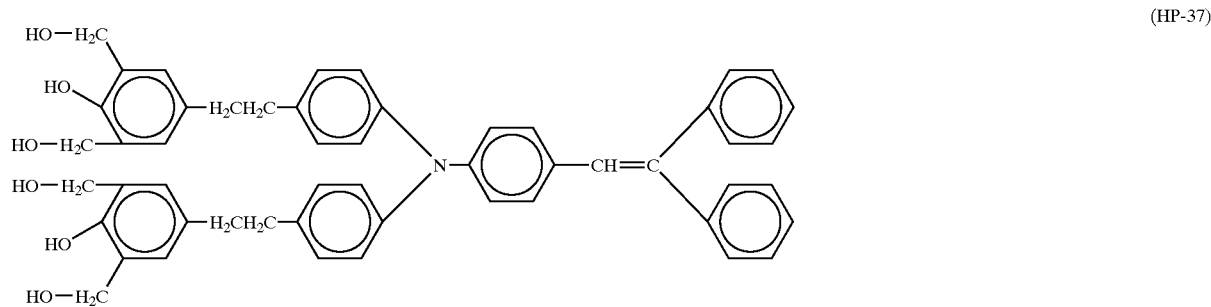
(HP-37)

The above specific examples are examples in which hydroxymethyl groups have been substituted at all the o-positions of the hydroxyl groups. In the present invention, however, at least one of the hydroxyphenyl groups may be a substituted hydroxyphenyl group having the hydroxymethyl group as a substituent. A mixture of those having different number of substitution of hydroxymethyl groups is also embraced in the phenolic compound of the present invention.

Next, as estimated structure of the oligomer contained in the resol resin having charge-transportable structure of the present invention, examples of products synthesized using the above (P-22) as a raw material are shown below. Note that the present invention is by no means limited to these examples.

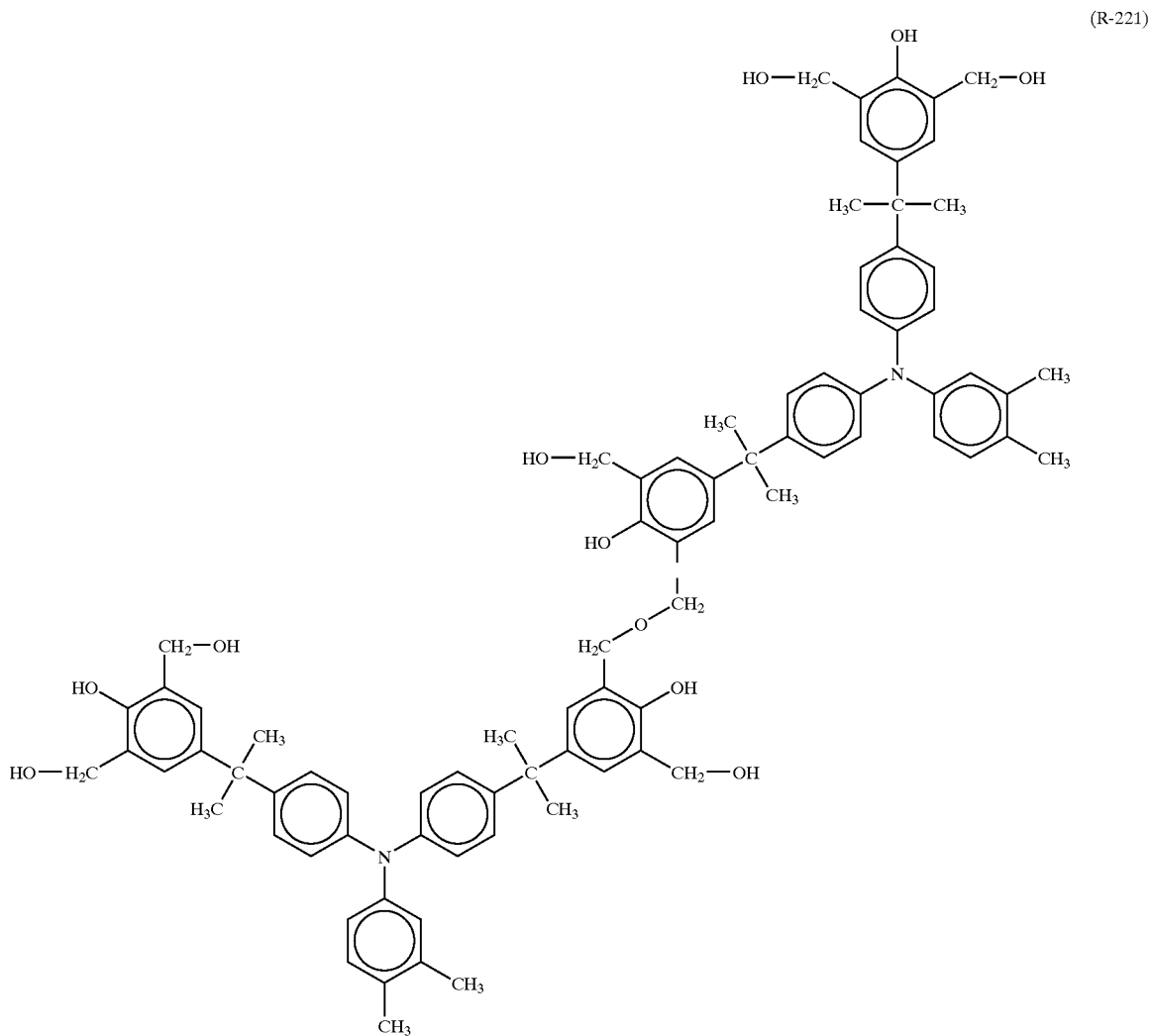

(R-221)

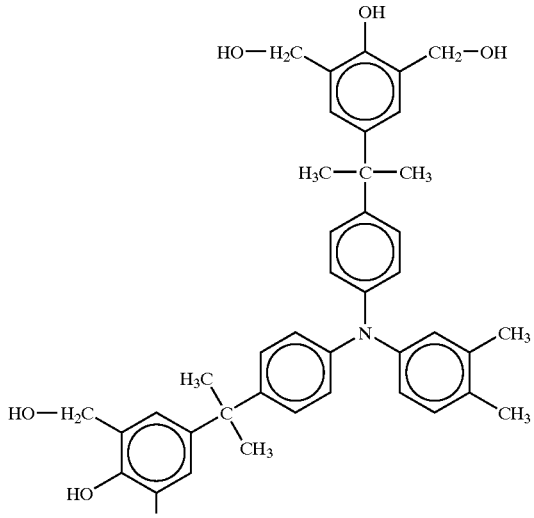
(R-222)

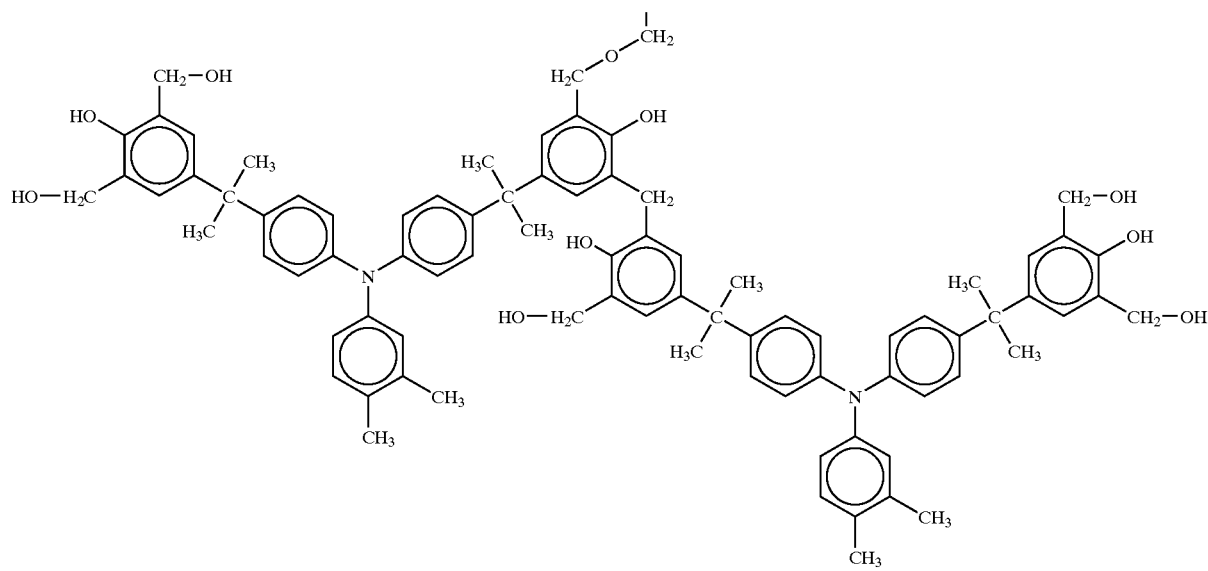

The structure of the oligomer may have a variety of combination in respect of the position of linkage, the form of linkage, the number of monomers connected and so forth. The above estimated structures are nothing but very some examples. The resol resin of the present invention is a mixture of such an oligomer and a monomer having hydroxymethyl groups.

In the phenolic compound and resol resin of the present invention, hydroxymethyl groups mutually cause dehydration condensation or formaldehyde removal reaction with ease upon heating to form additional linkages.

The hydroxymethyl groups also cause dehydration condensation reaction with hydrogen atoms at the o-positions as viewed from the hydroxyl groups of (chiefly) hydroxyphenyl groups having not yet been substituted, to form methylene linkages.

These reactions can be represented by reaction schemes as a model, which are as follows.

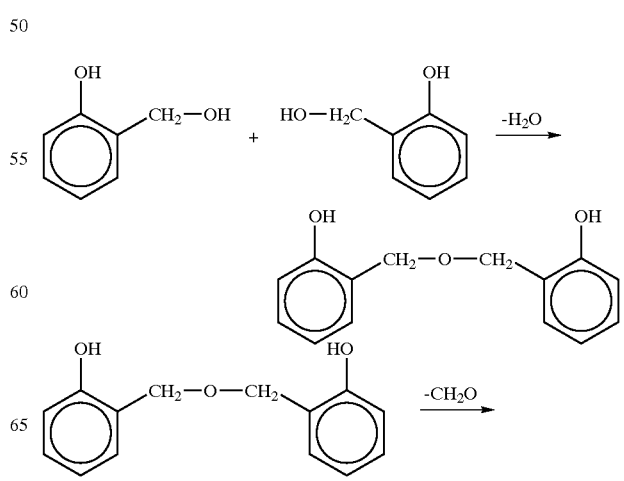

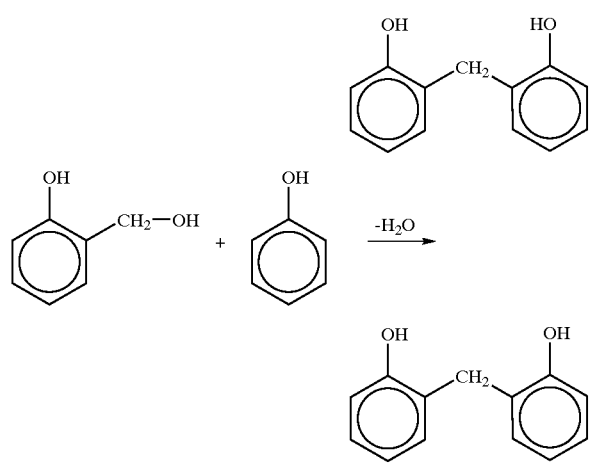

These reactions are reactions which take place specifically where hydroxymethyl groups are substituted on hydroxyphenyl groups to come present there. In other substituents, such curing reaction does not proceed.

The curing reaction begins to proceed at a relatively low temperature of about 130° C. to 160° C. The phenolic compound and resol resin of the present invention may be diluted with a solvent to prepare a coating material, and the coating material may preferably be coated on the surface of an object, followed by removal of the solvent and drying, and also heating to the temperature at which the curing reaction proceeds, to effect drying and also heat curing.

As estimated structure of the cured product of the present invention, an example of a product obtained by curing the phenolic compound or resol resin synthesized using the above (P-22) as a raw material is shown below. Note that the present invention is by no means limited to this example.

(S-22)

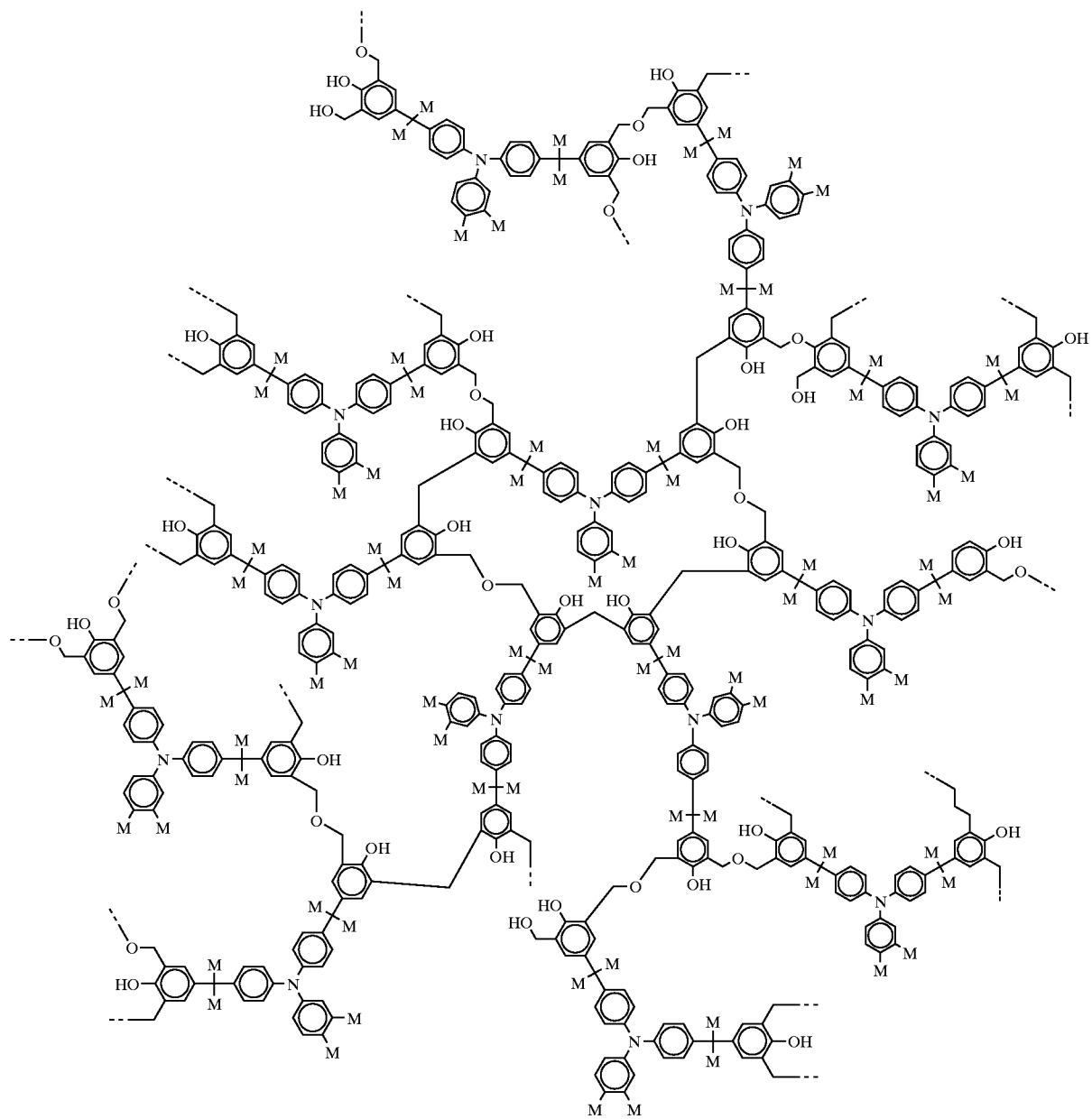

(In the above Formula (S-22), M represents a methyl group.)

It is shown that the hydroxymethyl groups on the hydroxyphenyl groups of the phenolic compound has are rich in reactivity for dehydration, formaldehyde removal, addition and so forth upon heating and hence readily form linkages between molecules to form a three-dimensional cured structure. Chiefly, the hydroxymethyl groups between molecules react to form benzyl-ether linkages or methylene linkages. Thus, the curing is accomplished.

The above (S-22) is the estimated structure to the last. As a matter of course, it may differ depending on the structure of side reaction or the like and on production conditions.

Incidentally, the cured products obtained from the phenolic compound and resol resin of the present invention have, in both cases, like structure as exemplified by the above (S-22).

As uses of the phenolic compound and resol resin of the present invention, besides electrophotographic photosensitive members described later, the phenolic compound and resol resin may also be used in devices which require thin films having charge-transporting function. For example, they may be used as members or films requiring charge-transporting function, of image sensors, electroluminescent devices, optical memories, solar cells and electrophotographic engravers.

The electrophotographic photosensitive member of the present invention is described below. The following description of the electrophotographic photosensitive member is description taking the case of those making use of (the cured product) of the phenolic compound of the present invention. The case of those making use of (the cured product) of the resol resin is also entirely alike.

The electrophotographic photosensitive member of the present invention comprises a support and provided thereon a photosensitive layer.

The photosensitive layer the electrophotographic photosensitive member of the present invention has may have any known layer construction such as a single-layer type in which it has a charge-generating material and a charge-transporting material in the same layer, a regular-layer type in which a charge generation layer containing a charge-generating material and a charge transport layer containing a charge-transporting material are superposed in this order, and a reverse-layer type in which a charge transport layer containing a charge-transporting material and a charge generation layer containing a charge-generating material are superposed in this order. The regular-layer type photosensitive layer is preferred in view of electrophotographic performance.

Note here that the hydroxymethyl-group-containing phenolic compound having charge-transportable structure of the present invention can have the effect of high durability when used in a surface layer of the electrophotographic photosensitive member. Accordingly, it may preferably be used as a material for a protective layer provided on the photosensitive layer having the above layer construction of a single-layer type, regular-layer type or reverse-layer type, or used as a material simultaneously having both functions as a charge-transporting material and a binder resin, for the single-layer type photosensitive layer or for the regular-layer type photosensitive layer. In particular, it may more preferably be used as the material for a protective layer.

FIG. 1A shows an example of an electrophotographic photosensitive member comprising a support 4 and provided thereon a charge generation layer 3 and a charge transport layer 2 in this order, and a protective layer 1 further provided as the surface layer of the electrophotographic photosensitive member.

Figure 1B:
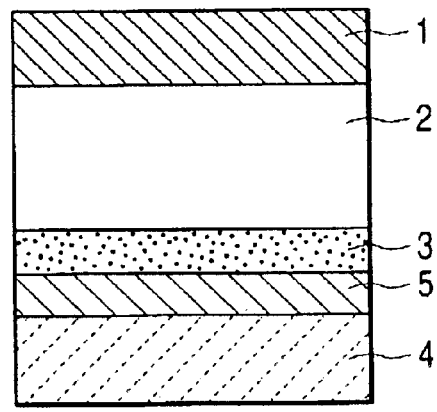
Figure 1C:
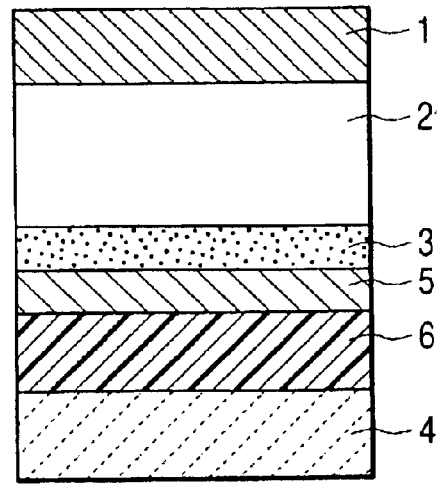

As also shown in FIGS. 1B and 1C, an intermediate layer 5 and also a conductive layer 6 aiming at prevention of interference fringes may further be provided between the support 4 and the charge generation layer 3.

In the case when the photosensitive layer is the single-layer type photosensitive layer, the layer may be provided by film-forming one layer having a charge-generating material and a charge-transporting material simultaneously.

As the support of the electrophotographic photosensitive member of the present invention, it may be one having conductivity. Usable are supports having conductivity in themselves, as exemplified by those made of aluminum, aluminum alloy or stainless steel, and besides, these supports or plastic supports having layers film-formed by vacuum deposition of aluminum, aluminum alloy or indium oxide-tin oxide alloy, supports comprising plastic or paper impregnated with conductive fine particles (e.g., carbon black, tin oxide, titanium oxide or silver particles) together with a suitable binder resin, and also plastics having a conductive binder resin.

An intermediate layer (an adhesion layer) having the function as a barrier and the function of adhesion may be provided between the support and the photosensitive layer. The intermediate layer is formed for the purposes of, e.g., improving the adhesion of the photosensitive layer, improving coating performance, protecting the support, covering any defects of the support, improving the injection of electric charges from the support and protecting the photosensitive layer from any electrical breakdown. The intermediate layer may be formed of, e.g., casein, polyvinyl alcohol, ethyl cellulose, ethylene-acrylic acid copolymer, polyamide, modified polyamide, polyurethane, gelatin or aluminum oxide. The intermediate layer may preferably have a layer thickness of 5 $\mu$m or less, and more preferably from 0.1 $\mu$m to 3 $\mu$m.

The charge generation layer of the electrophotographic photosensitive member of the present invention is formed of a binder resin with a charge-generating material dispersed therein.

The charge-generating material used in the electrophotographic photosensitive member of the present invention may include:

(1) azo pigments such as monoazo, disazo and trisazo;
(2) phthalocyanine pigments such as metal phthalocyanines and metal-free phthalocyanine;
(3) indigo pigments such as indigo and thioindigo;
(4) perylene pigments such as perylene acid anhydrides and perylene acid imides;
(5) polycyclic quinone pigments such as anthraquinone and pyrenequinone;
(6) squarilium dyes;
(7) pyrylium salts and thiapyrylium salts;
(8) triphenylmethane dyes;
(9) inorganic materials such as selenium, selenium-tellurium and amorphous silicon;
(10) quinacridone pigments;
(11) azulenium salt pigments;
(12) cyanine dyes;
(13) xanthene dyes;
(14) quinoneimine dyes;
(15) styryl dyes;
(16) cadmium sulfide; and
(17) zinc oxide.

Of these, azo pigments, phthalocyanine pigments, perylene pigments, polycyclic quinone pigments and azulenium salt pigments are preferred. Azo pigments and phthalocyanine pigments are more preferred.

The binder resin used to form the charge generation layer may include, e.g., polycarbonate resins, polyester resins, polyarylate resins, butyral resins, polystyrene resins, polyvinyl acetal resins, diallyl phthalate resins, acrylic resins, methacrylic resins, vinyl acetate resins, phenolic resins, silicone resins, polysulfone resins, styrene-butadiene copolymer resins, alkyd resins, epoxy resins, urea resins, and vinyl chloride-vinyl acetate copolymer resins. Any of these may be used alone or in the form of a mixture or copolymer of two or more types.

As a solvent used for a charge generation layer coating fluid, it may be selected taking account of the binder resin to be used and the solubility or dispersion stability of the charge-generating material. As an organic solvent, usable are alcohols, sulfoxides, ketones, ethers, esters, aliphatic halogenated hydrocarbons or aromatic compounds.

To form the charge generation layer, the above charge-generating material may be well dispersed in the binder resin, which is used in a 0.3- to 4-fold quantity, together with the solvent by means of a homogenizer, an ultrasonic dispersion machine, a ball mill, a sand mill, an attritor or a roll mill, and the resultant dispersion is coated, followed by drying. The charge generation layer may preferably be formed in a layer thickness of 5 $\mu$m or less, and particularly preferably from 0.01 $\mu$m to 1 $\mu$m.

To the charge generation layer, a sensitizer, an antioxidant, an ultraviolet absorber and a plasticizer which may be of various types, and any known charge-generating material may also optionally be added.

The charge transport layer of the electrophotographic photosensitive member of the present invention is formed of a binder resin with a charge-transporting material dissolved therein.

The charge-transporting material used in the electrophotographic photosensitive member of the present invention may include triarylamine compounds, hydrazone compounds, styryl compounds, stilbene compounds, pyrazoline compounds, oxazole compounds, thiazole compounds, and triarylmethane compounds.

As the binder resin used to form the charge transport layer, preferable are polyacrylate resins, polystyrene resins, polyester resins, polycarbonate resins, polyarylate resins, polysulfone resins, polyphenylene oxide resins, epoxy resins, polyurethane resins, alkyd resins and unsaturated resins. Particularly preferred resins may include polymethyl methacrylate resins, polystyrene resins, styrene-acrylonitrile copolymer resins, polycarbonate resins and diallyl phthalate resins.

The charge transport layer may commonly be formed by coating a solution prepared by dissolving the above charge-transporting material and binder resin in a solvent, followed by drying. The charge-transporting material and the binder resin may be mixed in a proportion of from about 2:1 to 1:2 in weight ratio.

As the solvent used in such a charge transport layer coating solution, usable are ketones such as acetone and methyl ethyl ketone; esters such as methyl acetate and ethyl acetate; ethers such as dimethoxymethane, tetrahydrofuran and dioxane; aromatic hydrocarbons such as toluene and xylene; and chlorine type hydrocarbons such as chlorobenzene, dichloromethane, chloroform and carbon tetrachloride.

When this coating solution is coated, coating methods as exemplified by dip coating, spray coating and spinner coating may be used. Also, the drying may be carried out at a temperature ranging preferably from 10° C. to 200° C., and more preferably from 20° C. to 150° C., for a time ranging preferably from 5 minutes to 5 hours, and more preferably from 10 minutes to 2 hours, under air drying, drying at rest or vacuum drying.

The charge transport layer is kept electrically connected with the above charge generation layer. It has the function to receive charge carriers injected from the charge generation layer in the presence of an electric field and at the same time transport these charge carriers to the interface between it and its surface side. This charge transport layer has a limit to the transporting of charge carriers, and hence it is not preferable to make the layer have a larger layer thickness than is necessary. The charge transport layer may preferably have a layer thickness of from 5 $\mu$m to 40 $\mu$m, and particularly preferably from 7 $\mu$m to 30 $\mu$m.

Where the hydroxymethyl-group-containing phenolic compound having charge-transportable structure of the present invention is used in the charge transport layer, it may be used in place of the charge-transporting material and binder resin described above. The hydroxymethyl-group-containing phenolic compound having charge-transportable structure of the present invention has both the function as a charge-transporting material and the function as a binder resin for itself alone. Hence, the function as an electrophotographic photosensitive member is ensured even when only the hydroxymethyl-group-containing phenolic compound having charge-transportable structure of the present invention is dissolved in a solvent to prepare a charge transport layer coating solution to form the charge transport layer. If necessary, the hydroxymethyl-group-containing phenolic compound having charge-transportable structure of the present invention and the charge-transporting material and binder resin described above may also be used in the form of a mixture.

As the solvent used when the hydroxymethyl-group-containing phenolic compound having charge-transportable structure of the present invention is used in the charge transport layer, it may include alcohols such as methanol, ethanol, propanol and butanol; ketones such as acetone and methyl ethyl ketone; esters such as methyl acetate, ethyl acetate and butyl acetate; ethers such as dimethoxymethane, tetrahydrofuran and dioxane: aromatic hydrocarbons such as toluene and xylene; and chlorine type hydrocarbons such as chlorobenzene, chloroform and carbon tetrachloride.

When the charge transport layer coating solution is coated, the same coating methods as described above may be used. Also, the drying may be carried out at a temperature ranging preferably from 10° C. to 200° C., and more preferably from 20° C. to 180° C., for a time ranging preferably from 5 minutes to 5 hours, and more preferably from 10 minutes to 2 hours, under air drying, drying at rest or vacuum drying.

The phenolic compound of the present invention may preferably be made to undergo heat curing reaction at the same time the solvent is removed, in the drying step after the charge transport layer coating solution has been coated.

The hydroxymethyl-group-containing phenolic compound having charge-transportable structure of the present invention is, under conditions of the drying after this coating, cross-linked by condensation reaction the hydroxymethyl groups chiefly cause, and becomes cured three-dimensionally, whereby the charge transport layer can be improved in strength as a film and can be endowed with a high durability.

Where the charge transport layer is the surface layer of the electrophotographic photosensitive member, the layer may be incorporated with, in addition to the hydroxymethyl-group-containing phenolic compound having charge-transportable structure of the present invention, lubricating particles such as fluorine-atom-containing resin particles such as tetrafluoroethylene resin or vinylidene fluoride resin particles, or silicone resin particles, silica particles or alumina particles by dispersing them, in order to improve durability, lubricity, toner transfer performance and so forth of the electrophotographic photosensitive member.

To the charge transport layer, an antioxidant, an ultraviolet absorber, a plasticizer and any known charge-transporting material may further optionally be added.

In the case when the charge transport layer is the surface layer of the electrophotographic photosensitive member, the hydroxymethyl-group-containing phenolic compound having charge-transportable structure of the present invention may also preferably be in an amount of from 1% by weight to 100% by weight, and more preferably from 50% by weight to 95% by weight, based on the total weight of the charge transport layer.

Where the photosensitive layer is of the single-layer type, the charge-generating material and the charge-transporting material are mixed in an any desired proportion, and the binder resin used in the charge generation layer or charge transport layer is used together. These are dissolved or dispersed in a solvent to prepare a coating fluid, and the coating fluid obtained is coated, followed by drying to form the layer. The one in which the charge-generating material and the charge-transporting material have been put together and the binder resin may preferably be mixed in a proportion of from 3:1 to 1:3.

As the solvent of such a single-layer type photosensitive layer coating fluid, the same one as that used when the charge generation layer or charge transport layer described above is formed.

When the single-layer type photosensitive layer coating fluid is coated, the same coating methods as described above may be used. Also, the drying may be carried out at a temperature ranging preferably from 10° C. to 200° C., and more preferably from 2° C. to 180° C., for a time ranging preferably from 5 minutes to 5 hours, and more preferably from 10 minutes to 2 hours, under air drying, drying at rest or vacuum drying.

The phenolic compound of the present invention may preferably be made to undergo heat curing reaction at the same time the solvent is removed, in the drying step after the single-layer type photosensitive layer coating fluid has been coated.

In the single-layer type photosensitive layer, too, it has a limit to the transporting of charge carriers, and hence it can not be made to have a larger layer thickness than is necessary. The single-layer type photosensitive layer may preferably have a layer thickness of from 5 $\mu$m to 40 $\mu$m, and particularly preferably from 7 $\mu$m to 30 $\mu$m.

Where the hydroxymethyl-group-containing phenolic compound having charge-transportable structure of the present invention is used in the single-layer type photosensitive layer, like the case when used in the charge transport layer, it may be used in place of the charge-transporting material and binder resin. The hydroxymethyl-group-containing phenolic compound having charge-transportable structure of the present invention has both the function of charge transport and the function as a binder resin. Hence, the single-layer type photosensitive layer can be film-formed without mixing any other resin.

However, like the foregoing, the hydroxymethyl-group-containing phenolic compound having charge-transportable structure of the present invention may be used in the form of its mixture with the charge-transporting material and the binder resin.

Other conditions may also be the same as those in the case when the charge transport layer is formed. In the case of the single-layer type photosensitive layer, too, it may be incorporated with lubricating particles such as fluorine-atom-containing resin particles such as tetrafluoroethylene resin or vinylidene fluoride resin particles, or silicone resin particles, silica particles or alumina particles by dispersing them, in order to improve durability, lubricity, toner transfer performance and so forth of the electrophotographic photosensitive member.

To the single-layer type photosensitive layer, an antioxidant, an ultraviolet absorber, a plasticizer and any known charge-transporting material may further optionally be added.

Where the single-layer type photosensitive layer is the surface layer, the hydroxymethyl-group-containing phenolic compound having charge-transportable structure of the present invention may also preferably be in an amount of from 1% by weight to 95% by weight, and more preferably from 10% by weight to 90% by weight, based on the total weight of the single-layer type photosensitive layer.

Where the hydroxymethyl-group-containing phenolic compound having charge-transportable structure of the present invention is used in the state it is incorporated in the protective layer, a protective-layer coating solution containing the hydroxymethyl-group-containing phenolic compound having charge-transportable structure of the present invention may be coated on the photosensitive layer, followed by drying and curing to provide the protective layer.

The protective layer containing the hydroxymethyl-group-containing phenolic compound having charge-transportable structure of the present invention is a three-dimensionally cross-linked cured film, and hence can achieve a sufficient durability even in a relatively small layer thickness. Also, the cured protective layer obtained has the function of charge transport, and hence any increase in residual potential and any potential variations at the time of running service which have been seen when conventional protective layers are provided may little occur. Thus, an electrophotographic photosensitive member can be provided which maintains stable image quality over a long period of time and does not cause any smeared images even when used over a long period of time in an environment of high temperature and high humidity.

Where the surface layer of the electrophotographic photosensitive member is the protective layer, a protective-layer coating solution prepared by dissolving or diluting the phenolic compound of the present invention in or with a solvent is coated on the photosensitive layer. After its coating, polymerization reaction takes place to form a cured protective layer.

As the solvent used to prepare the protective-layer coating solution, it is required to well dissolve the hydroxymethyl-group-containing phenolic compound having charge-transportable structure of the present invention, and ensure good dispersibility for the lubricating particles or the like when they are used. It further must be a solvent which does not adversely affect the photosensitive layer with which the protective-layer coating solution or dispersion is to come into contact.

Accordingly, usable as the solvent are alcohols such as methanol, ethanol and 2-propanol; ketones such as acetone and methyl ethyl ketone, esters such as methyl acetate, ethyl acetate and butyl acetate; ethers such as dimethoxymethane, tetrahydrofuran and dioxane; aromatic hydrocarbons such as toluene and xylene; and halogen type hydrocarbons such as chlorobenzene and dichloromethane, any of which may further be used in the form of a mixture. Of these, as solvents which are well capable of dissolving the hydroxymethyl-group-containing phenolic compound having charge-transportable structure of the present invention and do not adversely affect the photosensitive layer which is to stand an underlying layer when the coating solution is coated, alcohols such as methanol, ethanol and 2-propanol are more preferred.

In the protective layer of the electrophotographic photosensitive member of the present invention, in addition to the hydroxymethyl-group-containing phenolic compound having charge-transportable structure of the present invention, any known phenolic resin or other resin used when the charge transport layer is formed may also be used in the form of a mixture in order to improve strength of the protective layer. As the phenolic resin, any of known novolak resins, resol resins and so forth may be mixed. In order to improve properties of the protective layer, in addition to the hydroxymethyl-group-containing phenolic compound having charge-transportable structure of the present invention, any known charge-transporting material may also be used in the form of a mixture. As the charge-transporting material used in such a case, the one used when the photosensitive layer is formed may be used.

The protective layer of the electrophotographic photosensitive member of the present invention may be formed by any coating method commonly used, such as dip coating, spray coating, spinner coating, roller coating, Meyer bar coating and blade coating.

The protective layer may preferably have a layer thickness of from 0.1 $\mu$m to 10 $\mu$m, and more preferably from 0.5 $\mu$mm to 7 $\mu$m.

The protective layer, too, may be incorporated with lubricating particles such as fluorine-atom-containing resin particles such as tetrafluoroethylene resin or vinylidene fluoride resin particles, or silicone resin particles, silica particles or alumina particles by dispersing them, in order to improve durability, lubricity, toner transfer performance and so forth of the electrophotographic photosensitive member.

In the present invention, additives such as an antioxidant may be incorporated in the surface layer in order to prevent the surface layer from deteriorating because of adhesion of active substances such as ozone and nitrogen oxides generated at the time of charging.

In the case when the protective layer is the surface layer of the electrophotographic photosensitive member, the hydroxymethyl-group-containing phenolic compound having charge-transportable structure of the present invention may also preferably be in an amount of from 10% by weight to 100% by weight, and more preferably from 50% by weight to 100% by weight, based on the total weight of the protective layer.

Figure 2:
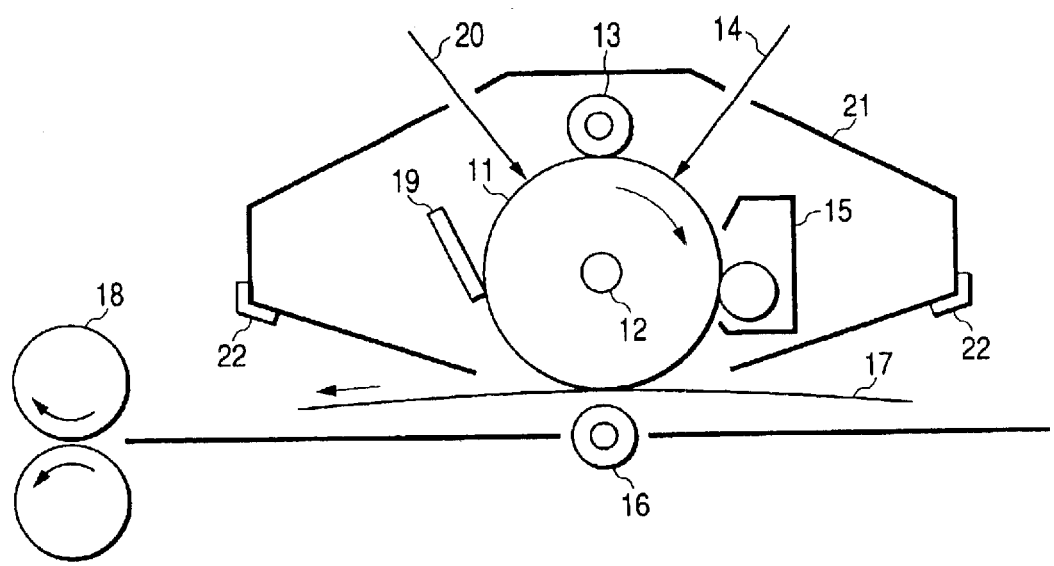
FIG. 2 is a schematic illustration of the construction of an electrophotographic apparatus provided with a process cartridge having the electrophotographic photosensitive member of the present invention.

FIG. 2 schematically illustrates the construction of an electrophotographic apparatus provided with a process cartridge having the electrophotographic photosensitive member of the present invention.

In FIG. 2, reference numeral 11 denotes a drum-shaped electrophotographic photosensitive member of the present invention, which is rotatingly driven around an axis 12 in the direction of an arrow at a stated peripheral speed. The electrophotographic photosensitive member 11 is, in the course of its rotation, uniformly electrostatically charged on its periphery to a positive or negative, given potential through a (primary) charging means 13. The electrophotographic photosensitive member thus charged is then exposed to exposure light 14 emitted from an exposure means (not shown) for slit exposure or laser beam scanning exposure and intensity-modulated correspondingly to time-sequential digital image signals of the intended image information. In this way, electrostatic latent images corresponding to the intended image information are successively formed on the periphery of the electrophotographic photosensitive member 11.

The electrostatic latent images thus formed are subsequently developed with toner by the operation of a developing means 15. The toner images thus formed and held on the surface of the electrophotographic photosensitive member 11 are then successively transferred by the operation of a transfer means 16, to a transfer material 17 fed from a paper feed section (not shown) to the part between the electrophotographic photosensitive member 11 and the transfer means 16 in the manner synchronized with the rotation of the electrophotographic photosensitive member 11.

The transfer material 17 on which the toner images have been transferred is separated from the surface of the electrophotographic photosensitive member, is led through a fixing means 18, where the toner images are fixed, and is then put out of the apparatus as an image-formed material (a print or copy).

The surface of the electrophotographic photosensitive member 11 from which images have been transferred is brought to removal of the toner remaining after the transfer, through a cleaning means 19. Thus, its surface is cleaned. The electrophotographic photosensitive member is further subjected to charge elimination by pre-exposure light emitted from a pre-exposure means (not shown), and then repeatedly used for the formation of images.

Incidentally, where the charging means 13 is a contact charging means making use of a charging roller, the pre-exposure is not necessarily required. Also, in an apparatus having construction in which the transfer residual toner is recycled, a cleanerless process may be used.

In the present invention, the apparatus may be constituted of a combination of plural components integrally joined as a process cartridge from among the constituents such as the above electrophotographic photosensitive member 11, charging means 13, developing means 15, transfer means 16 and cleaning means 19 so that the process cartridge is detachably mountable to the main body of an electrophotographic apparatus such as a copying machine or a laser beam printer. For example, at least one of the charging means 13, the developing means 15 and the cleaning means 19 may integrally be supported in a cartridge together with the electrophotographic photosensitive member 11 to form a process cartridge that is detachably mountable to the main body of the apparatus through a guide means 22 such as rails provided in the main body of the apparatus.

Where the electrophotographic apparatus is a copying machine or a printer, the exposure light 14 is light reflected from, or transmitted through, an original, or light irradiated by the scanning of a laser beam, the driving of an LED array or the driving of a liquid-crystal shutter array according to signals obtained by reading an original through a sensor and converting the information into signals. As the charging means 13, it may also include, in addition to the above charging roller, a corona charging assembly, a brush charging assembly, a magnetic-brush charging assembly and a blade charging assembly.

As the developing means 15, it may also include a jumping developing assembly, a one-component contact developing assembly and a two-component contact developing assembly.

As the transfer means 16, it may also include a roller transfer assembly, a corona transfer assembly, a blade transfer assembly, a belt transfer assembly and an intermediate transfer member.

As the fixing means 18, it may also include a heat roller fixing assembly, a heat belt fixing assembly and a pressure roller fixing assembly.

As the cleaning means 19, it may also include a blade cleaner, a roller cleaner, a brush cleaner and a suction cleaner.

The electrophotographic photosensitive member of the present invention may be not only applied in electrophotographic copying machines, but also widely applied in the fields where electrophotography is applied, e.g., laser beam printers, CRT printers, LED printers, facsimile machines, liquid-crystal printers, and laser platemaking.

The present invention is described below in greater detail by giving specific working examples. Note that the present invention is by no means limited to these working examples. In the following working examples, "part(s)" refers to "part(s) by weight".

SYNTHESIS EXAMPLES

Examples of how to synthesize the hydroxymethyl-group-containing phenolic compound having charge-transportable structure and resol resin having charge-transportable structure of the present invention are given below.

Synthesis Example 1

50 parts of the phenolic compound having structure represented by the formula (P-5) was dissolved in a mixture of 250 parts of an aqueous potassium hydroxide solution (10%) and 200 parts of methanol. To the solution formed, 150 parts of formalin (37%) was dropwise added over a period of 1 hours.

After the reaction was completed, the reaction mixture was introduced into an aqueous sulfuric acid solution to effect neutralization, and the product was crystallized.

To the pasty precipitate obtained, ethyl acetate was added to dissolve the precipitate, followed by washing with water four to five times using a separating funnel.

Finally, the organic layer formed was taken out, to which magnesium sulfuric anhydride was added to effect dehydration, and thereafter the organic layer dehydrated was concentrated by means of an evaporator to obtain crude crystals of the product.

The crude crystals thus obtained were recrystallized with 40 parts of methanol and 300 parts of diisopropyl ether to obtain the desired product as white powder. The yield was 70%.

Its purity was measured by reversed-phase HPLC (high-performance liquid chromatography) (column: Shodex C18-5B, trade name; available from Showa Denko K. K.; solvent: methanol/water=80/20) and GPC (gel permeation chromatography) (columns: TOSOH TSK Gourd Column HXL, TSKgel G2000HXL×2 and TSKgel G3000HXL×1, trade names; available from Tosoh Corporation; solvent: THF). Tetrahydroxymethyl unit (those having four hydroxymethyl groups) content was found to be solvent: THF). Tetrahydroxymethyl unit (those having four hydroxymethyl groups) content was found to be 86%.

Synthesis Example 2

50 parts of the phenolic compound having structure represented by the formula (P-5) was dissolved in a mixture of 50 parts of ammonia water (28%). 150 parts of methanol and 20 parts of triethylamine. To the solution formed, 150 parts of formalin (37%) was dropwise added over a period of 30 minutes with stirring. Thereafter, the resultant reaction mixture was heated to 60° C. Keeping this temperature, reaction was carried out for 24 hours with stirring.

After the reaction was completed, the reaction mixture was concentrated under reduced pressure. After the mixture came to increase in viscosity, 200 parts of methanol and 100 parts of water were added, and further the solvents were removed under reduced pressure. This procedure was repeated twice, and the remaining amine catalyst was removed.

After the solvents were removed, methanol was added to the resultant viscous resin component to obtain a product as a resol resin varnish having a solid content of 60% by weight. The varnish yield was 77 parts.

The content of monomers and dimers was measured by the same GPC as that used in Synthesis Example 1. As the result, monomers were found to be in a content of 70% and dimers 24% (as structural units of the raw-material phenolic compound).

Synthesis Example 3

In place of the phenolic compound having structure represented by the formula (P-5) which was used in Synthesis Example 1, 50 parts of the phenolic compound having structure represented by the formula (P-15) was mixed with 150 parts of an aqueous potassium hydroxide solution (10%) and 1,000 parts of methanol. The solution formed was heated to 50° C. to dissolve the phenolic compound, and then 75 parts of formalin (37%) was dropwise added over a period of 1 hour.

After the addition was completed, the reaction was carried out at 50° C. for further 50 hours, and the post treatment was made in the same manner as in Synthesis Example 1. The phenolic compound thus obtained was recrystallized in basically the same manner as in Synthesis Example 1.

Namely, it was recrystallized with 10 parts of methanol and 250 parts of diisopropyl ether to obtain the desired product as white powder. The yield was 56%.

Its purity was measured by the same HPLC and GPC as those used in Synthesis Example 1. The dihydroxymethyl unit content was found to be 87%.

Synthesis Example 4

In place of the phenolic compound having structure represented by the formula (P-5) which was used in Synthesis Example 2, 50 parts of the phenolic compound having structure represented by the formula (P-15) was dissolved in a mixture of 50 parts of ammonia water (28%), 550 parts of methanol and 100 parts of triethylamine. To the solution formed, 75 parts of formalin (37%) was dropwise added over a period of 30 minutes with stirring. Thereafter, the resultant reaction mixture was heated to 50° C. Keeping this temperature, reaction was carried out for 24 hours with stirring.

That is, the procedure of Synthesis Example 2 was repeated except that the phenolic compound was changed for the phenolic compound having structure represented by the formula (P-15). Thus, a novel resol resin of the present invention was synthesized.

The resol resin obtained was passed through the step of removing the catalyst under reduced pressure in the same manner as in Synthesis Example 2. Then, methanol was added to obtain a product as a resol resin varnish having a solid content of 60% by weight. The varnish yield was 75 parts.

The content of monomers and dimers was measured by the same GPC as that used in Synthesis Example 1. As the result, monomers were found to be in a content of 66% and dimers 28% (as structural units of the raw-material phenolic compound).

Synthesis Example 5

In place of the phenolic compound having structure represented by the formula (P-5) which was used in Synthesis Example 1, 50 parts of the phenolic compound having structure represented by the formula (P-22) was mixed with 250 parts of an aqueous potassium hydroxide solution (10%) and 200 parts of methanol. The solution formed was heated to 40° C. to dissolve the phenolic compound, and then 150 parts of formalin (37%) was dropwise added over a period of 1 hour.

After the addition was completed, the reaction was carried out at 40° C. for further 36 hours, and the post treatment was made in the same manner as in Synthesis Example 1. The phenolic compound thus obtained was recrystallized in basically the same manner as in Synthesis Example 1. Namely, it was recrystallized with 40 parts of methanol and 320 parts of diisopropyl ether to obtain the desired product as white powder. The yield was 68%.

Its purity was measured by the same HPLC and GPC as those used in Synthesis Example 1. The tetrahydroxymethyl unit content was found to be 88%.

Synthesis Example 6

In place of the phenolic compound having structure represented by the formula (P-5) which was used in Synthesis Example 2, 50 parts of the phenolic compound having structure represented by the formula (P-22) was dissolved in a mixture of 50 parts of ammonia water (28%), 150 parts of methanol and 20 parts of triethylamine. To the solution formed, 150 parts of formalin (37%) was dropwise added over a period of 30 minutes with stirring. Thereafter, the resultant reaction mixture was heated to 50° C. Keeping this temperature, reaction was carried out for 24 hours with stirring.

Except the foregoing, the procedure of Synthesis Example 2 was repeated to synthesize a novel resol resin of the present invention.

The resol resin obtained was passed through the step of removing the catalyst under reduced pressure in the same manner as in Synthesis Example 2. Then, methanol was added to obtain a product as a resol resin varnish having a solid content of 60% by weight. The varnish yield was 76 parts.

The content of monomers and dimers was measured by the same GPC as that used in Synthesis Example 1. As the result, monomers were found to be in a content of 52% and dimers 34% (as structural units of the raw-material phenolic compound).

Synthesis Example 7

In place of the phenolic compound having structure represented by the formula (P-5) which was used in Synthesis Example 2, 50 parts of the phenolic compound having structure represented by the formula (P-26) was dissolved in a mixture of 50 parts of ammonia water (28%), 250 parts of methanol and 20 parts of triethylamine. To the solution formed, 200 parts of formalin (37%) was dropwise added over a period of 30 minutes with stirring. Thereafter, the resultant reaction mixture was heated to 50° C. Keeping this temperature, reaction was carried out for 16 hours with stirring.

Except the foregoing, the procedure of Synthesis Example 2 was repeated to synthesize a novel resol resin of the present invention.

The resol resin obtained was passed through the step of removing the catalyst under reduced pressure in the same manner as in Synthesis Example 2. Then, methanol was added to obtain a product as a resol resin varnish having a solid content of 60% by weight. The varnish yield was 78 parts.

The content of monomers and dimers was measured by the same GPC as that used in Synthesis Example 1. As the result, monomers were found to be in a content of 46% and dimers 38% (as structural units of the raw-material phenolic compound).

Synthesis Example 8

In place of the phenolic compound having structure represented by the formula (P-5) which was used in Synthesis Example 2, 50 parts of the phenolic compound having structure represented by the formula (P-32) was dissolved in a mixture of 50 parts of ammonia water (28%), 450 parts of methanol and 30 parts of triethylamine. To the solution formed, 250 parts of formalin (371) was dropwise added over a period of 30 minutes with stirring. Thereafter, the resultant reaction mixture was heated to 50° C. Keeping this temperature, reaction was carried out for 12 hours with stirring.

Except the foregoing, the procedure of Synthesis Example 2 was repeated to synthesize a novel resol resin having charge-transportable of the present invention.

The resol resin obtained was passed through the step of removing the catalyst under reduced pressure in the same manner as in Synthesis Example 2. Then, methanol was added to obtain a product as a resol resin varnish having a solid content of 60% by weight. The varnish yield was 77 parts.

The content of monomers and dimers was measured by the same GPC as that used in Synthesis Example 1. As the result, monomers were found to be in a content of 50% and dimers 35% (as structural units of the raw-material phenolic compound).

Example 1

An aluminum cylinder of 357.5 mm in length and 30 mm in diameter (JISA3003 aluminum alloy) was used as a support. On this support, a methanol solution of 5% by weight of a polyamide resin (trade name: AMILAN CM8000; available from Toray Industries, Inc.) was coated by dip coating, followed by drying to form an intermediate layer with a layer thickness of 0.5 μm.

Next, 4 parts of an oxytitanium phthalocyanine pigment having structure represented by the following formula:

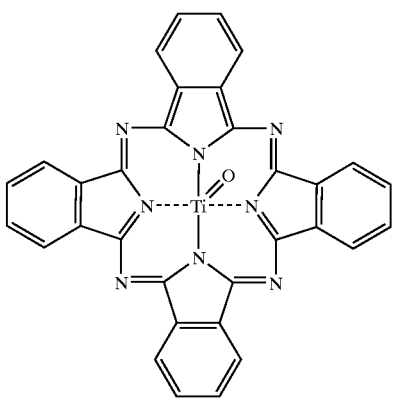

and being of a crystal form having strong peaks at Bragg's angles (2θ±0.2°) of 9.0° and 27.1° in the CuKα characteristic X-ray diffraction, 2 parts of polyvinyl butyral resin (trade name: S-LEC BX-1; available from Sekisui Chemical Co., Ltd.) and 110 parts of cyclohexanone were dispersed for 4.5 hours by means of a sand mill using glass beads of 1 mm in diameter, followed by dilution with 130 parts of ethyl acetate to prepare a charge generation layer coating dispersion. This charge generation layer coating dispersion was coated on the above intermediate layer by dipping, followed by drying to form a charge generation layer with a layer thickness of 0.18 μm.

Next, 7.5 parts of a charge-transporting material having structure represented by the following formula:

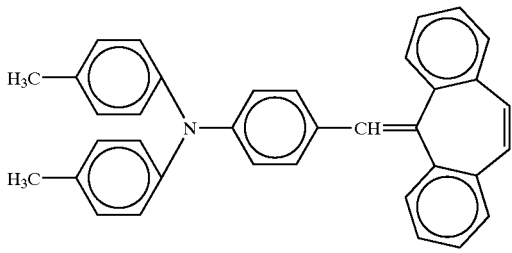

and 10 parts of a bisphenol-Z type polycarbonate (trade name: IUPILON Z-200; available from Mitsubishi Gas Chemical Company, Inc.) were dissolved in a mixed solvent of 60 parts of monochlorobenzene and 20 parts of dimethoxymethane. The solution thus prepared was coated on the above charge generation layer by dipping, followed by hot-air drying at 110° C. for 1 hour to form a charge transport layer with a layer thickness of 17 μm.

Next, for a protective layer, 30 parts of the hydroxymethyl-group-containing phenolic compound having charge-transportable structure which was obtained in Synthesis Example 1 and 70 parts of ethanol were mixed, and then stirred for 2 hours to effect dissolution to prepare a protective-layer coating solution. Using this protective-layer coating solution, a film was formed on the above charge transport layer by dip coating, followed by hot-air drying at 145° C. for 1 hour to form a protective layer with a layer thickness of 3 μm. Thus, an electrophotographic photosensitive member was produced.

The protective-layer coating solution had good coating properties, and the protective layer formed was an unevenness-free, uniform film.

To evaluate the cure characteristics of the protective layer formed, a wiper made of paper was soaked with methyl ethyl ketone, and then made to adhere to the film surface and rub the surface in such a way as to rub the chemical into the film, where how the film dissolved was observed. As the result, the protective layer was not scrapable off, and was found to have completely cured.

The electrophotographic photosensitive member produced in this way was set in an electrophotographic apparatus to make evaluation.

To evaluate electrophotographic performance, the electrophotographic photosensitive member was set in a modified machine of a laser electrostatic-transfer system copying machine (trade name: GP-405: manufacture by CANON INC.). As sensitivity, its surface was so set as to be charged at a dark-area potential of −700 V, and was exposed to laser light of 780 nm in wavelength, where the amount of light necessary for the potential of −700 V to attenuate to −200 V was measured to examine the sensitivity Δ500 ($\mu J/cm^2$). The potential when exposed to light with energy of 20 $J/cm^2$ was also measured as residual potential Vr (V).

In addition, as evaluation by image reproduction running on 30,000 sheets using the same copying machine, image quality was evaluated and abrasion level was measured at the initial stage and after the running.

The image quality was evaluated on items of gradation reproducibility, any scratches having appeared on images, any fog having appeared on white-background images, and changes in density.

The abrasion level was measured with an eddy-current layer thickness measuring device manufactured by Fischer Co., Germany.

To evaluate also potential variations after use in the running, the sensitivity Δ500 and the residual potential Vr were measured after the image reproduction running on 30,000 sheets.

To make evaluation on smeared images which may appear when used in running in an environment of high temperature and high humidity, the electrophotographic photosensitive member described above was set in the above copying machine to make a running test in an environment of 30° C./80% RH. Whether or not the smeared images appeared at what point of time in the course of the running test made up to 30,000 sheets was observed.

The results of observation are shown in Table 1.

Example 2

On the same aluminum cylinder as that of Example 1, the same intermediate layer, charge generation layer and charge transport layer as those of Example 1 were formed by coating.

Next, for a protective layer, in place of the protective layer of Example 1, 50 parts of the varnish of the resol resin having charge-transportable structure which was obtained in Synthesis Example 2 (solid content: 60% by weight) and 50 parts of ethanol were mixed, and then stirred for 2 hours to effect dissolution to prepare a protective-layer coating solution. Using this protective-layer coating solution, a film was formed on the above charge transport layer by dip coating in the same manner as in Example 1, followed by hot-air drying at 145° C. for 1 hour to form a protective layer with a layer thickness of 3 μm. The protective-layer coating solution had good coating properties, and the protective layer formed was an unevenness-free, uniform film.

The electrophotographic photosensitive member thus obtained was evaluated in the same manner as in Example 1. The results of observation are shown in Table 1.

Example 3

On the same aluminum cylinder as that of Example 1, the same intermediate layer, charge generation layer and charge transport layer as those of Example 1 were formed by coating.

Next, for a protective layer, in place of the protective layer of Example 1, 24 parts of the hydroxymethyl-group-containing phenolic compound having charge-transportable structure which was obtained in Synthesis Example 3, 10 parts of resol type phenolic resin (trade name: PL-4852; available from Gun-ei Chemical Industry Co., Ltd.)(solid content: 60% by weight) and 66 parts of ethanol were mixed, and then stirred for 2 hours to effect dissolution to prepare a protective-layer coating solution. Using this protective-layer coating solution, a film was formed on the above charge transport layer by dip coating in the same manner as in Example 1, followed by hot-air drying at 145° C. for 1 hour to form a protective layer with a layer thickness of 3 $\mu$m. The protective-layer coating solution had good coating properties, and the protective layer formed was an unevenness-free, uniform film.

The electrophotographic photosensitive member thus obtained was evaluated in the same manner as in Example 1. The results of observation are shown in Table 1.

Example 4

On the same aluminum cylinder as that of Example 1, the same intermediate layer, charge generation layer and charge transport layer as those of Example 1 were formed by coating.

Next, for a protective layer, in place of the protective layer of Example 1, 40 parts of the varnish of the resol resin having charge-transportable structure which was obtained in Synthesis Example 4 (solid content: 60% by weight), 10 parts of resol type phenolic resin (trade name: PL-4852; available from Gun-ei Chemical Industry Co., Ltd.)(solid content: 60% by weight) and 50 parts of ethanol were mixed, and then stirred for 2 hours to effect dissolution to prepare a protective-layer coating solution. Using this protective-layer coating solution, a film was formed on the above charge transport layer by dip coating in the same manner as in Example 1, followed by hot-air drying at 145° C. for 1 hour to form a protective layer with a layer thickness of 3 $\mu$m. The protective-layer coating solution had good coating properties, and the protective layer formed was an unevenness-free, uniform film.

The electrophotographic photosensitive member thus obtained was evaluated in the same manner as in Example 1. The results of observation are shown in Table 1.

Example 5

On the same aluminum cylinder as that of Example 1, the same intermediate layer, charge generation layer and charge transport layer as those of Example 1 were formed by coating.

Next, for a protective layer, in place of the protective layer of Example 1, 30 parts of the hydroxymethyl-group-containing phenolic compound having charge-transportable structure which was obtained in Synthesis Example 5 and 70 parts of ethanol were mixed, and then stirred for 2 hours to effect dissolution to prepare a protective-layer coating solution. Using this protective-layer coating solution, a film was formed on the above charge transport layer by dip coating in the same manner as in Example 1, followed by hot-air drying at 145° C. for 1 hour to form a protective layer with a layer thickness of 3 $\mu$m. The protective-layer coating solution had good coating properties, and the protective layer formed was an unevenness-free, uniform film. The electrophotographic photosensitive member thus obtained was evaluated in the same manner as in Example 1. The results of observation are shown in Table 1.

Example 6

On the same aluminum cylinder as that of Example 1, the same intermediate layer, charge generation layer and charge transport layer as those of Example 1 were formed by coating.

Next, for a protective layer, in place of the protective layer of Example 1, 50 parts of the varnish of the resol resin having charge-transportable structure which was obtained in Synthesis Example 6 (solid content: 60% by weight) and 50 parts of ethanol were mixed, and then stirred for 2 hours to effect dissolution to prepare a protective-layer coating solution. Using this protective-layer coating solution, a film was formed on the above charge transport layer by dip coating in the same manner as in Example 1, followed by hot-air drying at 145° C. for 1 hour to form a protective layer with a layer thickness of 3 $\mu$m. The protective-layer coating solution had good coating properties, and the protective layer formed was an unevenness-free, uniform film.

The electrophotographic photosensitive member thus obtained was evaluated in the same manner as in Example 1. The results of observation are shown in Table 1.

Example 7

On the same aluminum cylinder as that of Example 1, the same intermediate layer, charge generation layer and charge transport layer as those of Example 1 were formed by coating.

Next, for a protective layer, in place of the protective layer of Example 1, 50 parts of the varnish of the resol resin having charge-transportable structure which was obtained in Synthesis Example 7 (solid content: 60% by weight) and 50 parts of ethanol were mixed, and then stirred for 2 hours to effect dissolution to prepare a protective-layer coating solution. Using this protective-layer coating solution, a film was formed on the above charge transport layer by dip coating in the same manner as in Example 1, followed by hot-air drying at 145° C. for 1 hour to form a protective layer with a layer thickness of 3 $\mu$m. The protective-layer coating solution had good coating properties, and the protective layer formed was an unevenness-free, uniform film.

The electrophotographic photosensitive member thus obtained was evaluated in the same manner as in Example 1. The results of observation are shown in Table 1.

Example 8

On the same aluminum cylinder as that of Example 1, the same intermediate layer, charge generation layer and charge transport layer as those of Example 1 were formed by coating.

Next, for a protective layer, in place of the protective layer of Example 1, 50 parts of the varnish of the resol resin having charge-transportable structure which was obtained in Synthesis Example 8 (solid content: 60% by weight) and 50 parts of ethanol were mixed, and then stirred for 2 hours to effect dissolution to prepare a protective-layer coating solution. Using this protective-layer coating solution, a film was formed on the above charge transport layer by dip coating in the same manner as in Example 1, followed by hot-air drying at 145° C. for 1 hour to form a protective layer with a layer thickness of 3 $\mu$m. The protective-layer coating solution had good coating properties, and the protective layer formed was an unevenness-free, uniform film.

The electrophotographic photosensitive member thus obtained was evaluated in the same manner as in Example 1. The results of observation are shown in Table 1.

Example 9

On the same aluminum cylinder as that of Example 1, the same intermediate layer and charge generation layer as those of Example 1 were formed by coating.

Next, for a charge transport layer, in place of the charge transport layer of Example 1, 12.5 parts of the hydroxymethyl-group-containing phenolic compound having charge-transportable structure which was obtained in Synthesis Example 3 and 5 parts of a bisphenol-Z type polycarbonate resin (trade name: IUPILON Z-200; available from Mitsubishi Gas Chemical Company, Inc.) were dissolved in a mixed solvent of 40 parts of 1,4-dioxane and 32 parts of dimethoxymethane. The solution thus prepared was dip-coated on the above charge generation layer, followed by hot-air drying at 145° C. for 1 hour to form a charge transport layer with a layer thickness of 20 μm.

The electrophotographic photosensitive member thus obtained was evaluated in the same manner as in Example 1. The results of observation are shown in Table 1.

Comparative Example 1

On the same aluminum cylinder as that of Example 1, the same intermediate layer and charge generation layer as those of Example 1 were formed by coating.

Next, for a charge transport layer, the same charge transport layer coating solution of Example 1 was dip-coated on the above charge generation layer, followed by hot-air drying at 110° C. for 1 hour to form a charge transport layer with a layer thickness of 30 μm.

The electrophotographic photosensitive member thus obtained was evaluated in the same manner as in Example 1. The results of observation are shown in Table 1.

Comparative Example 2

On the same aluminum cylinder as that of Example 1, the same intermediate layer, charge generation layer and charge transport layer as those of Example 1 were formed by coating.

Next, for a protective layer, 50 parts of treated tin oxide particles by surface-treating (amount of treatment: 7%) 100 parts of antimony-doped tin oxide particles with an average particle diameter of 0.02 μm (trade name: T-1; available from Mitsubishi Material Co., Ltd.) with 7 parts of a fluorine-atom-containing compound (trade name: LS-1090; available from Shin-Etsu Silicone Co., Ltd.) having structure represented by the following formula:

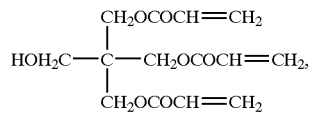

and 150 parts of ethanol were dispersed by means of a sand mill for 60 hours, and thereafter 20 parts of polytetrafluoroethylene particles (average particle diameter: 0.18 μm) were further added, followed by further dispersion for 8 hours. Thereafter, 30 parts of an acrylic resin monomer having structure represented by the following formula:

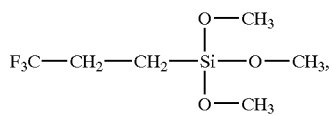

and 2 parts of 2-methylthioxanthone as a photopolymerization initiator was added and dissolved to prepare a protective-layer coating dispersion.

This protective-layer coating dispersion was dip-coated on the above charge transport layer to form a film, which was subsequently photocured at a light intensity of 800 mW/cm$^2$ for 60 seconds by means of a high-pressure mercury lamp, followed by hot-air drying at 120° C. for 2 hours to form a protective layer with a layer thickness of 3 μm.

Except the forgoing, the procedure of Example 1 was repeated to produce an electrophotographic photosensitive member. Evaluation was made in the same way. The results of observation are shown in Table 1.

Comparative Example 3

On the same aluminum cylinder as that of Example 1, the same intermediate layer, charge generation layer and charge transport layer as those of Example 1 were formed by coating.

Next, for a protective layer, a solution prepared by mixing 50 parts of resol type phenolic resin (trade name: PL-4852; available from Gun-ei Chemical Industry Co., Ltd.)(solid content: 60% by weight) and 50 parts of ethanol was dip-coated as a protective layer coating solution on the charge transport layer, followed by hot-air drying at 145° C. for 1 hour to form a protective layer with a layer thickness of 3 μm.

The electrophotographic photosensitive member thus obtained was evaluated in the same manner as in Example 1. The results of observation are shown in Table 1.

This electrophotographic photosensitive member had so low sensitivity and so high residual potential that only a low image density was achievable, which was not on the level tolerable for the image reproduction running test.

Comparative Example 4

On the same aluminum cylinder as that of Example 1, the same intermediate layer, charge generation layer and charge transport layer as those of Example 1 were formed by coating.

Next, for a protective layer, a solution prepared by mixing 30 parts of a phenolic compound having structure represented by the following formula:

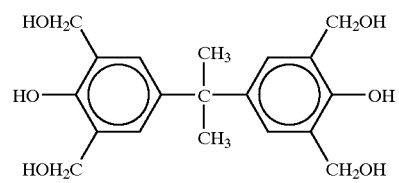

and having no charge-transportable structure and 70 parts of ethanol was dip-coated as a protective layer coating solution on the charge transport layer, followed by hot-air drying at 145° C. for 1 hour to form a protective layer with a layer thickness of 3 μm.

The electrophotographic photosensitive member thus obtained was evaluated in the same manner as in Example 1. The results of observation are shown in Table 1.

This electrophotographic photosensitive member had so high residual potential that only a low image density was achievable, which was not on the level tolerable for the image reproduction running test.

Comparative Example 5

On the same aluminum cylinder as that of Example 1, the same intermediate layer, charge generation layer and charge transport layer as those of Example 1 were formed by coating.

Next, a solution prepared by mixing 30 parts of the phenolic compound having structure represented by the formula (P-22) and 70 parts of ethanol was dip-coated as a coating solution on the charge transport layer, followed by hot-air drying at 145° C. for 1 hour to form a protective layer with a layer thickness of 3 µm.

To evaluate the cure characteristics of the layer formed, a wiper made of paper was soaked with methyl ethyl ketone, and then made to adhere to the film surface and rub the surface in such a way as to rub the chemical into the film, where how the film dissolved was observed. As the result, the film on the charge transport layer was scrapable off with ease, and was found to have not cured.

The electrophotographic photosensitive member thus obtained was evaluated in the same manner as in Example 1. The results of observation are shown in Table 1.

Since the layer at the surface of this electrophotographic photosensitive member did not cure, the layer at the surface was soon scraped off after the running was started. During the running, the charge transport layer came to the outermost surface layer to become worn away. The running on 30,000 sheets like that in Example 1 was not achievable, and the charge transport layer became thinner to come lower than the serviceable limit, so that the image reproduction became poor.

Comparative Example 6

On the same aluminum cylinder as that of Example 1, the same intermediate layer, charge generation layer and charge transport layer as those of Example 1 were formed by coating.

Next, like a protective layer, a solution prepared by mixing 30 parts of a phenolic compound having structure represented by the following formula:

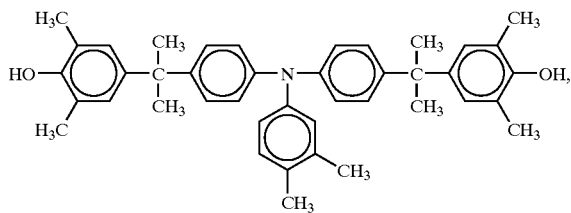

60 parts of ethanol and 10 parts of methyl ethyl ketone was dip-coated as a coating solution on the charge transport layer, followed by hot-air drying at 145° C. for 1 hour to form a layer with a layer thickness of 3 µm.

To evaluate the cure characteristics of the layer formed, a wiper made of paper was soaked with methyl ethyl ketone, and then made to adhere to the film surface and rub the surface in such a way as to rub the chemical into the film, where how the film dissolved was observed. As the result, the film on the charge transport layer was scrapable off with ease, and was found to have not cured.

The electrophotographic photosensitive member thus obtained was evaluated in the same manner as in Example 1. The results of observation are shown in Table 1.

Since the layer at the surface of this electrophotographic photosensitive member did not cure, the layer at the surface was soon scraped off after the running was started. During the running, the charge transport layer came to the outermost surface layer to become worn away. The running on 30,000 sheets like that in Example 1 was not achievable, and the charge transport layer became thinner to come lower than the serviceable limit, so that the image reproduction became poor.

Comparative Example 7

On the same aluminum cylinder as that of Example 1, the same intermediate layer, charge generation layer and charge transport layer as those of Example 1 were formed by coating.

Next, like a protective layer, a solution prepared by mixing 4 parts of a phenolic compound having structure represented by the following formula:

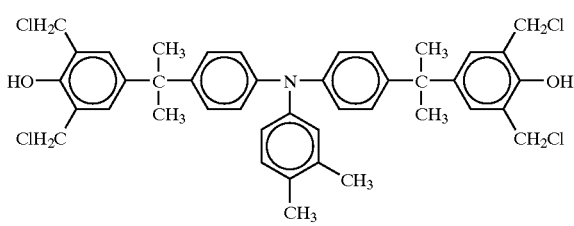

and 96 parts of cyclohexanone was spray-coated as a coating solution on the charge transport layer, followed by hot-air drying at 145° C. for 1 hour to form a layer with a layer thickness of 3 µm.

To evaluate the cure characteristics of the layer formed, a wiper made of paper was soaked with methyl ethyl ketone, and then made to adhere to the film surface and rub the surface in such a way as to rub the chemical into the film, where how the film dissolved was observed. As the result, the film on the charge transport layer was scrapable off with ease, and was found to have not cured.

The electrophotographic photosensitive member thus obtained was evaluated in the same manner as in Example 1. The results of observation are shown in Table 1.

Since the layer at the surface of this electrophotographic photosensitive member did not cure, the layer at the surface was soon scraped off after the running was started. During the running, the charge transport layer came to the outermost surface layer to become worn away. The running on 30,000 sheets like that in Example 1 was not achievable, and the charge transport layer became thinner to come lower than the serviceable limit, so that the image reproduction became poor.

Comparative Example 8

On the same aluminum cylinder as that of Example 1, the same intermediate layer, charge generation layer and charge transport layer as those of Example 1 were formed by coating.

Next, like a protective layer, a solution prepared by mixing 30 parts of a phenolic compound having structure represented by the following formula:

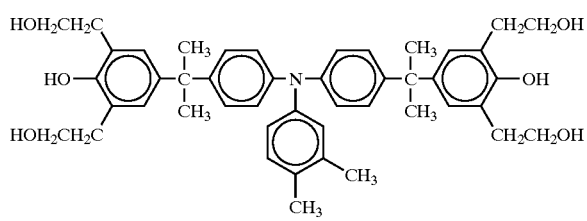

and 70 parts of methanol was dip-coated as a coating solution on the charge transport layer, followed by hot-air drying at 145° C. for 1 hour to form a layer with a layer thickness of 3 μm.

To evaluate the cure characteristics of the layer formed, a wiper made of paper was soaked with methyl ethyl ketone, and then made to adhere to the film surface and rub the surface in such a way as to rub the chemical into the film, where how the film dissolved was observed. As the result, the film on the charge transport layer was scrapable off with ease, and was found to have not cured.

The electrophotographic photosensitive member thus obtained was evaluated in the same manner as in Example 1. The results of observation are shown in Table 1.

Since the layer at the surface of this electrophotographic photosensitive member did not cure, the layer at the surface was soon scraped off after the running was started. During the running, the charge transport layer came to the outermost surface layer to become worn away. The running on 30,000 sheets like that in Example 1 was not achievable, and the charge transport layer became thinner to come lower than the serviceable limit, so that the image reproduction became poor.

Comparative Example 9

On the same aluminum cylinder as that of Example 1, the same intermediate layer, charge generation layer and charge transport layer as those of Example 1 were formed by coating.

Next, like a protective layer, a solution prepared by mixing 30 parts of a hydroxymethyl-group-containing compound having structure represented by the following formula:

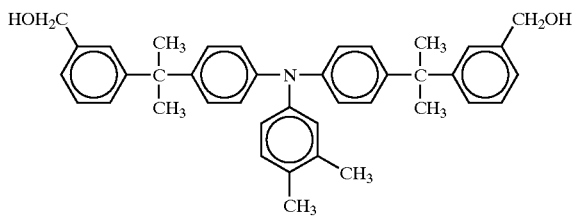

and 70 parts of methanol was dip-coated as a coating solution on the charge transport layer, followed by hot-air drying at 145° C. for 1 hour to form a layer with a layer thickness of 3 μm.

To evaluate the cure characteristics of the layer formed, a wiper made of paper was soaked with methyl ethyl ketone, and then made to adhere to the film surface and rub the surface in such a way as to rub the chemical into the film, where how the film dissolved was observed. As the result, the film on the charge transport layer was scrapable off with ease, and was found to have not cured.

The electrophotographic photosensitive member thus obtained was evaluated in the same manner as in Example 1. The results of observation are shown in Table 1.

Since the layer at the surface of this electrophotographic photosensitive member did not cure, the layer at the surface was soon scraped off after the running was started. During the running, the charge transport layer came to the outermost surface layer to become worn away. The running on 30,000 sheets like that in Example 1 was not achievable, and the charge transport layer became thinner to come lower than the serviceable limit, so that the image reproduction became poor.

Comparative Example 10

On the same aluminum cylinder as that of Example 1, the same intermediate layer, charge generation layer and charge transport layer as those of Example 1 were formed by coating.

Next, like a protective layer, a solution prepared by mixing 30 parts of a hydroxymethyl-group-containing compound having structure represented by the following formula:

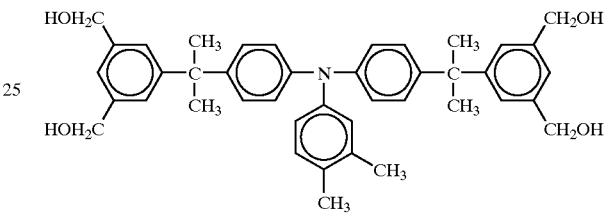

and 70 parts of methanol was dip-coated as a coating solution on the charge transport layer, followed by hot-air drying at 145° C. for 1 hour to form a layer with a layer thickness of 3 μm.

To evaluate the cure characteristics of the layer formed, a wiper made of paper was soaked with methyl ethyl ketone, and then made to adhere to the film surface and rub the surface in such a way as to rub the chemical into the film, where how the film dissolved was observed. As the result, the film on the charge transport layer was scrapable off with ease, and was found to have not cured.

The electrophotographic photosensitive member thus obtained was evaluated in the same manner as in Example 1. The results of observation are shown in Table 1.

Since the layer at the surface of this electrophotographic photosensitive member did not cure, the layer at the surface was soon scraped off after the running was started. During the running, the charge transport layer came to the outermost surface layer to become worn away. The running on 30,000 sheets like that in Example 1 was not achievable, and the charge transport layer became thinner to come lower than the serviceable limit, so that the image reproduction became poor.

Comparative Example 11

On the same aluminum cylinder as that of Example 1, the same intermediate layer, charge generation layer and charge transport layer as those of Example 1 were formed by coating.

Next, a solution prepared by dissolving 3 parts of the phenolic compound having structure represented by the formula (P-5) and 4 parts of a solution of polyisocyanate (solid content: 67% by weight) having structure represented by the following formula:

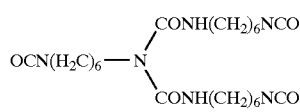

in 120 parts of cyclohexanone was spray-coated as a coating solution on the charge transport layer, followed by drying at room temperature for 10 minutes and thereafter hot-air drying at 150° C. for 1 hour to form a layer with a layer thickness of 3 μm.

To evaluate the cure characteristics of the layer formed, a wiper made of paper was soaked with methyl ethyl ketone, and then made to adhere to the film surface and rub the surface in such a way as to rub the chemical into the film, where how the film dissolved was observed. As the result, the film on the charge transport layer was not scrapable off with ease, and was found to have cured to a certain degree although not comparable to the surface layers of the electrophotographic photosensitive member of Examples.

The electrophotographic photosensitive member thus obtained was evaluated in the same manner as in Example 1. The results of observation are shown in Table 1.

TABLE 1

| | | Initial stage | | After 30,000-sheet running | | | | |
|---|---|---|---|---|---|---|---|---|
| | Cure characteristics | Sensitivity Δ500 (μJ/cm²) | Residual potential Vr (−V) | Sensitivity Δ500 (μJ/cm²) | Residual potential Vr (−V) | Abrasion level (μm) | Image evaluation | Smeared images in environment of 30° C./80% RH |
| Example: | | | | | | | | |
| 1 | Good. | 0.28 | 35 | 0.29 | 40 | 0.9 | No image defects. | No smeared images up to 30,000 sheets. |
| 2 | Good. | 0.30 | 33 | 0.31 | 38 | 1.0 | No image defects. | No smeared images up to 30,000 sheets. |
| 3 | Good. | 0.29 | 29 | 0.31 | 33 | 1.1 | No image defects. | No smeared images up to 30,000 sheets. |
| 4 | Good. | 0.29 | 33 | 0.32 | 37 | 1.2 | No image defects. | No smeared images up to 30,000 sheets. |
| 5 | Good. | 0.28 | 35 | 0.30 | 39 | 0.8 | No image defects. | No smeared images up to 30,000 sheets. |
| 6 | Good. | 0.28 | 36 | 0.31 | 39 | 0.8 | No image defects. | No smeared images up to 30,000 sheets. |
| 7 | Good. | 0.32 | 37 | 0.33 | 39 | 1.0 | No image defects. | No smeared images up to 30,000 sheets. |
| 8 | Good. | 0.30 | 32 | 0.32 | 33 | 0.9 | No image defects. | No smeared images up to 30,000 sheets. |
| 9 | Good. | 0.34 | 46 | 0.38 | 51 | 5.2 | No image defects. | No smeared images up to 30,000 sheets. |
| Comparative Example: | | | | | | | | |
| 1 | — | 0.26 | 22 | 0.40 | 17 | 19 | Scratching, image density decrease, poor highlight gradation. | Smeared images begin to occur on about 26,000 sheets. |
| 2 | Poor. | 0.47 | 37 | 0.32 | 83 | 1.7 | Smeared images, image density decrease, poor dot reproducibility. | Smeared images begin to occur at the initial stage. |
| 3 | Poor. | 0.76 | 187 | — | — | — | Images are not reproducible. | — |
| 4 | Poor. | — | 263 | — | — | — | Sensitivity is not measurable, images are not reproducible. | — |
| 5 | Poor. | — | — | — | — | — | Not evaluable. | — |
| 6 | Poor. | — | — | — | — | — | Not evaluable. | — |
| 7 | Poor. | — | — | — | — | — | Not evaluable. | — |
| 8 | Poor. | — | — | — | — | — | Not evaluable. | — |
| 9 | Poor. | — | — | — | — | — | Not evaluable. | — |
| 10 | Poor. | — | — | — | — | — | Not evaluable. | — |
| 11 | Poor a little | 0.44 | 73 | 0.56 | 105 | 2.9 | Scratching, image density decrease, poor highlight gradation. | Smeared images begin to occur on about 8,000 sheets. |

According to the present invention, it is possible to provide a novel phenolic compound and a novel resol resin which are able to endow electrophotographic photosensitive members with excellent properties (surface properties) to improve durability to the occurrence of wear and scratches, lessen residual-potential increase and potential variations, and maintain high-grade image quality over a long period of time, and also provide cured products thereof.

According to the present invention, it is also possible to provide an electrophotographic photosensitive member having a surface layer containing the above novel phenolic compound or novel resol resin, i.e., an electrophotographic photosensitive member which has a high durability to the occurrence of wear and scratches, has small residual-potential increase and potential variations, can maintain high-grade image quality over a long period of time and does not cause any smeared images when used over a long period of time in an environment of high temperature and high humidity; and a process cartridge and an electrophotographic apparatus which have such an electrophotographic photosensitive member.

What is claimed is:

1. An electrophotographic photosensitive member comprising a support and provided thereon a photosensitive layer, wherein;

said electrophotographic photosensitive member has a surface layer which contains a cured product of a phenolic compound; said phenolic compound having a charge-transportable structure and at least one substituted hydroxyphenyl group having a at least one hydroxymethyl group as a substituent.

2. The electrophotographic photosensitive member according to claim 1, wherein at least one of said at least one substituted hydroxyphenyl group is a substituted p-hydroxyphenyl group.

3. The electrophotographic photosensitive member according to claim 1, wherein at least one of said at least one hydroxymethyl group is linked at the position which is the o-position in respect to any of the hydroxyl groups of the at least one substituted hydroxyphenyl group having at least one hydroxymethyl group as a substituent.

4. The electrophotographic photosensitive member according to claim 1, wherein said charge-transportable structure is triarylamine structure.

5. The electrophotographic photosensitive member according to claim 1, wherein said phenolic compound has structure represented by any one of the following Formulas (1) to (5):

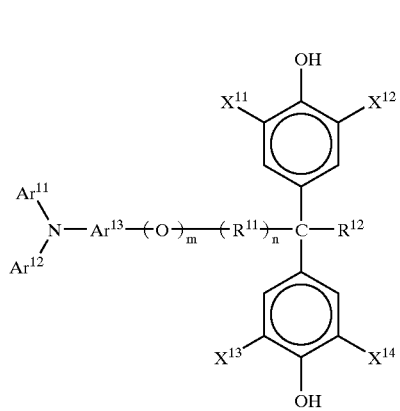

(1)

wherein $R^{11}$ represents a divalent hydrocarbon group having 1 to 8 carbon atoms and which may be branched; $R^{12}$ represents a hydrogen atom, a substituted or unsubstituted alkyl group, a substituted or unsubstituted aralkyl group or a substituted or unsubstituted phenyl group; $Ar^{11}$ and $Ar^{12}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; $Ar^{13}$ represents a substituted or unsubstituted divalent aromatic hydrocarbon ring group or a substituted or unsubstituted divalent aromatic heterocyclic group; letter symbols m and n are each independently 0 or 1; and $X^{11}$ to $X^{14}$ each independently represent a hydrogen atom or a hydroxymethyl group, provided that at least one of $X^{11}$ to $X^{14}$ is a hydroxymethyl group;

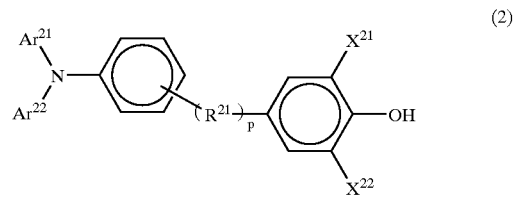

(2)

wherein $R^{21}$ represents a divalent hydrocarbon group having 1 to 8 carbon atoms and which may be branched; $Ar^{21}$ and $Ar^{22}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings may combine to form a ring via $R^{21}$; a letter symbol p is 0 or 1; and $X^{21}$ and $X^{22}$ each independently represent a hydrogen atom or a hydroxymethyl group, provided that at least one of $X^{21}$ and $X^{22}$ is a hydroxymethyl group;

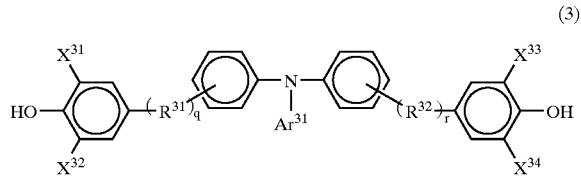

(3)

wherein $R^{31}$ and $R^{32}$ each independently represent a divalent hydrocarbon group having 1 to 8 carbon atoms and which may be branched; $Ar^{31}$ represents a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings linked via $R^{31}$ may combine to form a ring via $R^{31}$; the two benzene rings linked via $R^{32}$ may combine to form a ring via $R^{32}$; letter symbols q and r are each independently 0 or 1; and $X^{31}$ to $X^{34}$ each independently represent a hydrogen atom or a hydroxymethyl group, provided that at least one of $X^{31}$ to $X^{34}$ is a hydroxymethyl group;

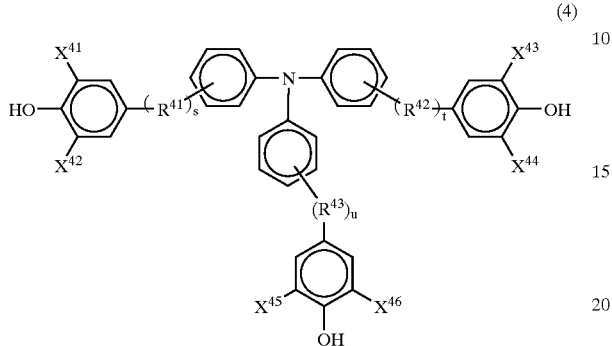

(4)

wherein $R^{41}$ to $R^{43}$ each independently represent a divalent hydrocarbon group having 1 to 8 carbon atoms and which may be branched; the two benzene rings linked via $R^{41}$ may combine to form a ring via $R^{41}$; the two benzene rings linked via $R^{42}$ may combine to form a ring via $R^{42}$; the two benzene rings linked via $R^{43}$ may combine to form a ring via $R^{43}$; letter symbols s, t and u are each independently 0 or 1; and $X^{41}$ to $X^{46}$ each independently represent a hydrogen atom or a hydroxymethyl group, provided that at least one of $X^{41}$ to $X^{46}$ is a hydroxymethyl group; and

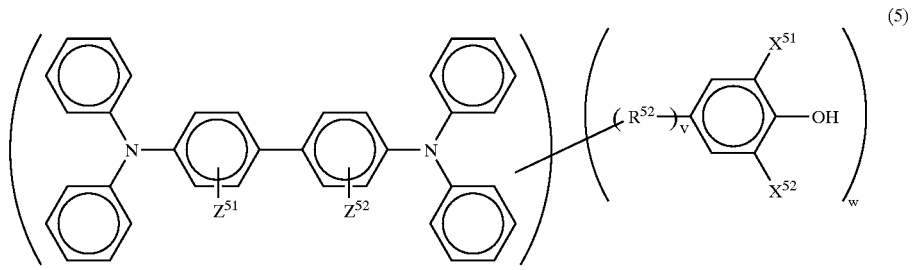

(5)

wherein $R^{52}$ represents a divalent hydrocarbon group having 1 to 8 carbon atoms and which may be branched; $Z^{51}$ and $Z^{52}$ each independently represent a hydrogen atom, a halogen atom, a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the benzene ring having $Z^{51}$ and the benzene ring having $Z^{52}$ may combine via $Z^{51}$ or $Z^{52}$ to form a ring; a letter symbol v is 0 or 1; a letter symbol w is an integer of 1 to 4; and $X^{51}$ and $X^{52}$ each independently represent a hydrogen atom or a hydroxymethyl group, provided that at least one of $X^{51}$ and $X^{52}$ is a hydroxymethyl group.

6. The electrophotographic photosensitive member according to claim 1, which has a protective layer on said photosensitive layer, and said surface layer of the electrophotographic photosensitive member is the protective layer.

7. An electrophotographic photosensitive member comprising a support and provided thereon a photosensitive layer, wherein;

said electrophotographic photosensitive member has a surface layer which contains a cured product of a resol resin obtained by allowing a phenolic compound, to react with formaldehyde in the presence of a basic catalyst;

said phenolic compound having a charge-transportable structure and at least one hydroxyphenyl group; and said resol resin having charge-transportable structure.

8. The electrophotographic photosensitive member according to claim 7, wherein at least one of said at least one hydroxyphenyl group is a p-hydroxyphenyl group.

9. The electrophotographic photosensitive member according to claim 7, wherein said charge-transportable structure is triarylamine structure.

10. The electrophotographic photosensitive member according to claim 7, wherein said phenolic compound having at least one hydroxyphenyl group and charge-transportable structure has structure represented by any one of the following Formulas (6) to (10):

(6)

$$Ar^{61}\!\!-\!\!N\!\!-\!\!Ar^{63}\!\!-\!\!(O)_{m'}\!\!-\!\!(R^{61})_{n'}\!\!-\!\!C\!\!-\!\!R^{62}$$
with two 4-hydroxyphenyl groups on the central carbon and $Ar^{62}$ on the nitrogen.

wherein $R^{61}$ represents a divalent hydrocarbon group having 1 to 8 carbon atoms and which may be branched, $R^{62}$ represents a hydrogen atom, a substituted or unsubstituted alkyl group, a substituted or unsubstituted aralkyl group or a substituted or unsubstituted phenyl group; $Ar^{61}$ and $Ar^{62}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; $Ar^{63}$ represents a substituted or unsubstituted divalent aromatic hydrocarbon ring group or a substituted or unsubstituted divalent aromatic heterocyclic group; and letter symbols m' and n' are each independently 0 or 1;

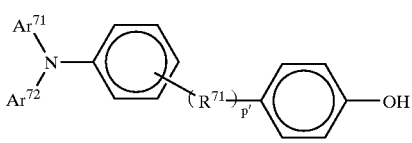

(7)

wherein $R^{71}$ represents a divalent hydrocarbon group having 1 to 8 carbon atoms and which may be branched; $Ar^{71}$ and $Ar^{72}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings may combine to form a ring via $R^{71}$; and a letter symbol p' is 0 or 1;

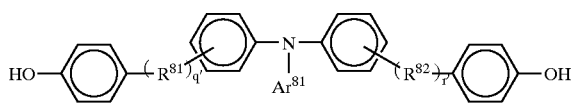

(8)

wherein $R^{81}$ and $R^{82}$ each independently represent a divalent hydrocarbon group having 1 to 8 carbon atoms and which may be branched; $Ar^{81}$ represents a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings linked via $R^{81}$ may combine to form a ring via $R^{81}$; the two benzene rings linked via $R^{82}$ may combine to form a ring via $R^{82}$; and letter symbols q' and r' are each independently 0 or 1;

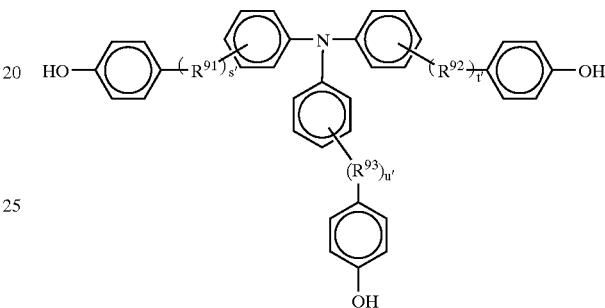

(9)

wherein $R^{91}$ to $R^{93}$ each independently represent a divalent hydrocarbon group having 1 to 8 carbon atoms and which may be branched; the two benzene rings linked via $R^{91}$ may combine to form a ring via $R^{91}$; the two benzene rings linked via $R^{92}$ may combine to form a ring via $R^{92}$; the two benzene rings linked via $R^{93}$ may combine to form a ring via $R^{93}$; letter symbols s', t' and u' are each independently 0 or 1; and

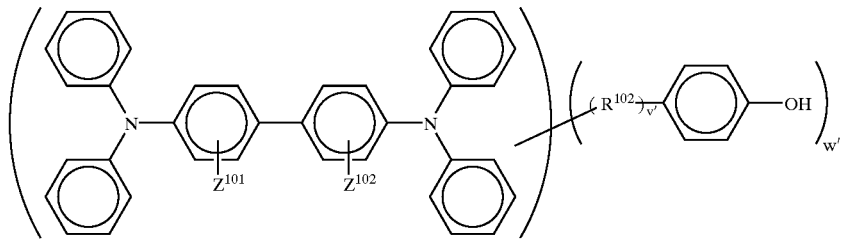

(10)

wherein $R^{102}$ represents a divalent hydrocarbon group having 1 to 8 carbon atoms and which may be branched; $Z^{101}$ and $Z^{102}$ each independently represent a hydrogen atom, a halogen atom, a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the benzene ring having $Z^{101}$ and the benzene ring having $Z^{102}$ may combine via $Z^{101}$ or $Z^{102}$ to form a ring; a letter symbol v' is 0 or 1; and a letter symbol w' is an integer of 1 to 4.

11. The electrophotographic photosensitive member according to claim 7, wherein said basic catalyst is an amine catalyst.

12. The electrophotographic photosensitive member according to claim 11, wherein said amine catalyst is a tertiary alkylamine.

13. The electrophotographic photosensitive member according to claim 7, wherein said basic catalyst is a catalyst containing an alkali metal or a catalyst containing an alkaline earth metal.

14. The electrophotographic photosensitive member according to claim 7, which has a protective layer on said photosensitive layer, and said surface layer of the electrophotographic photosensitive member is the protective layer.

15. A process cartridge comprising an electrophotographic photosensitive member and a means selected from the group consisting of a charging means, a developing means, a transfer means and a cleaning means which are integrally supported, and being detachably mountable to the main body of an electrophotographic apparatus, wherein;

said electrophotographic photosensitive member is an electrophotographic photosensitive member comprising a support and provided thereon a photosensitive layer;

said electrophotographic photosensitive member having a surface layer which contains a cured product of a phenolic compound; said phenolic compound having a charge-transportable structure and at least one substituted hydroxyphenyl group having at least one hydroxymethyl group as a substituent.

16. The process cartridge according to claim 15 wherein at least one of said at least one substituted hydroxyphenyl group is a substituted p-hydroxyphenyl group.

17. The process cartridge according to claim 15 wherein at least one of said at least one hydroxymethyl group is linked at the position which is the o-position in respect to any of the hydroxyl groups of the at least one substituted hydroxyphenyl group having at least one hydroxymethyl group as a substituent.

18. The process cartridge according to claim 15 wherein said charge-transportable structure is triarylamine structure.

19. The process cartridge according to claim 15, wherein said phenolic compound has structure represented by any one of the following Formulas (1) to (5):

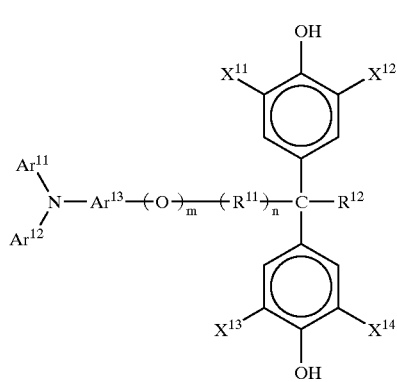

(1)

wherein $R^{11}$ represents a divalent hydrocarbon group having 1 to 8 carbon atoms and which may be branched; $R^{12}$ represents a hydrogen atom, a substituted or unsubstituted alkyl group, a substituted or unsubstituted aralkyl group or a substituted or unsubstituted phenyl group; $Ar^{11}$ and $Ar^{12}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; $Ar^{13}$ represents a substituted or unsubstituted divalent aromatic hydrocarbon ring group or a substituted or unsubstituted divalent aromatic heterocyclic group; letter symbols m and n are each independently 0 or 1; and $X^{11}$ to $X^{14}$ each independently represent a hydrogen atom or a hydroxymethyl group, provided that at least one of $X^{11}$ to $X^{14}$ is a hydroxymethyl group;

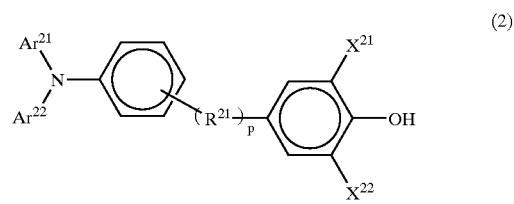

(2)

wherein $R^{21}$ represents a divalent hydrocarbon group having 1 to 8 carbon atoms and which may be branched; $Ar^{21}$ and $Ar^{22}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings may combine to form a ring via $R^{21}$; a letter symbol p is 0 or 1; and $X^{21}$ and $X^{22}$ each independently represent a hydrogen atom or a hydroxymethyl group, provided that at least one of $X^{21}$ and $X^{22}$ is a hydroxymethyl group;

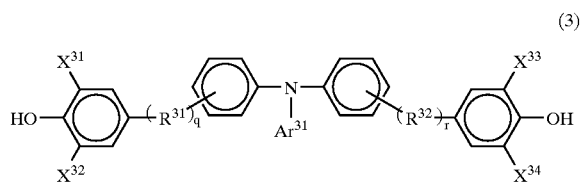

(3)

wherein $R^{31}$ and $R^{32}$ each independently represent a divalent hydrocarbon group having 1 to 8 carbon atoms and which may be branched; $Ar^{31}$ represents a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings linked via $R^{31}$ may combine to form a ring via $R^{31}$; the two benzene rings linked via $R^{32}$ may combine to form a ring via $R^{32}$; letter symbols q and r are each independently 0 or 1; and $X^{31}$ to $X^{34}$ each independently represent a hydrogen atom or a hydroxymethyl group, provided that at least one of $X^{31}$ to $X^{34}$ is a hydroxymethyl group;

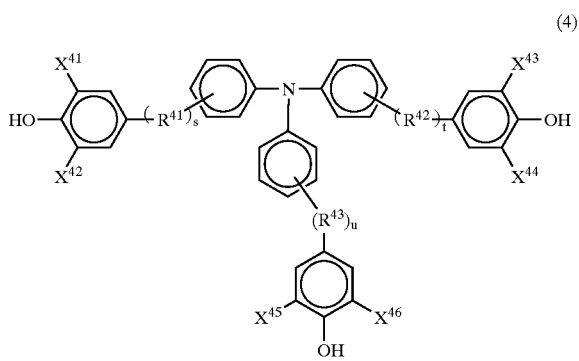

(4)

wherein $R^{41}$ to $R^{43}$ each independently represent a divalent hydrocarbon group having 1 to 8 carbon atoms and which may be branched; the two benzene rings linked via $R^{41}$ may combine to form a ring via $R^{41}$; the two benzene rings linked via $R^{42}$ may combine to form a ring via $R^{42}$; the two benzene rings linked via $R^{43}$ may combine to form a ring via $R^{43}$; letter symbols s, t and u are each independently 0 or 1; and $X^{41}$ to $X^{46}$ each independently represent a hydrogen atom or a hydroxymethyl group, provided that at least one of $X^{41}$ to $X^{46}$ is a hydroxymethyl group; and

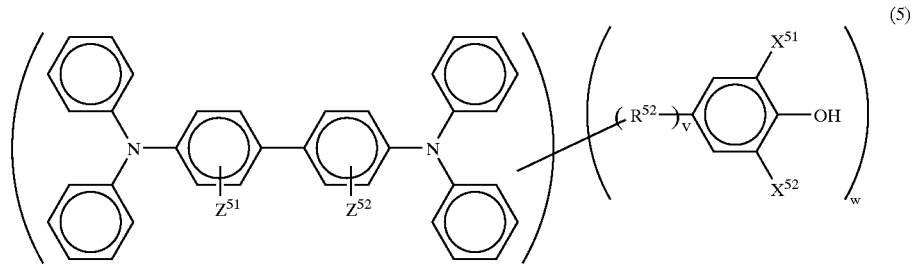

(5)

wherein $R^{52}$ represents a divalent hydrocarbon group having 1 to 8 carbon atoms and which may be branched; $Z^{51}$ and $Z^{52}$ each independently represent a hydrogen atom, a halogen atom, a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the benzene ring having $Z^{51}$ and the benzene ring having $Z^{52}$ may combine via $Z^{51}$ or $Z^{52}$ to form a ring; a letter symbol v is 0 or 1; a letter symbol w is an integer of 1 to 4; and $X^{51}$ and $X^{52}$ each independently represent a hydrogen atom or a hydroxymethyl group, provided that at least one of $X^{51}$ and $X^{52}$ is a hydroxymethyl group.

20. The process cartridge according to claim 15, wherein said surface layer of the electrophotographic photosensitive member is a protective layer.

21. A process cartridge comprising an electrophotographic photosensitive member and at least one means selected from the group consisting of a charging means, a developing means, a transfer means and a cleaning means which are integrally supported, and being detachably mountable to the main body of an electrophotographic apparatus, wherein;

said electrophotographic photosensitive member is an electrophotographic photosensitive member comprising a support and provided thereon a photosensitive layer;

said electrophotographic photosensitive member having a surface layer which contains a cured product of a resol resin obtained by allowing a phenolic compound having, to react with formaldehyde in the presence of a basic catalyst;

said phenolic compound having a charge-transportable structure and at least one hydroxyphenyl group; and said resol resin having charge-transportable structure.

22. The process cartridge according to claim 21, wherein at least one of said at least one hydroxyphenyl group is a p-hydroxyphenyl group.

23. The process cartridge according to claim 21, wherein said charge-transportable structure is triarylamine structure.

24. The process cartridge according to claim 21, wherein said phenolic compound having at least one hydroxyphenyl group and charge-transportable structure has structure represented by any one of the following Formulas (6) to (10):

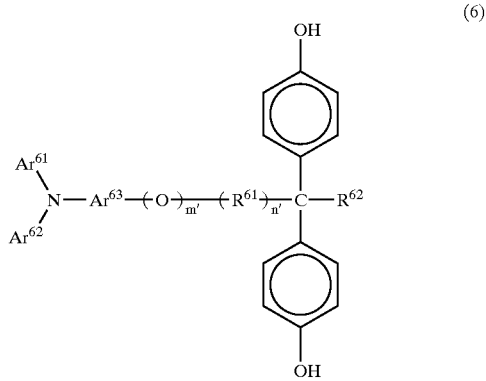

(6)

wherein $R^{61}$ represents a divalent hydrocarbon group having 1 to 8 carbon atoms and which may be branched, $R^{62}$ represents a hydrogen atom, a substituted or unsubstituted alkyl group, a substituted or unsubstituted aralkyl group or a substituted or unsubstituted phenyl group; $Ar^{61}$ and $Ar^{62}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; $Ar^{63}$ represents a substituted or unsubstituted divalent aromatic hydrocarbon ring group or a substituted or unsubstituted divalent aromatic heterocyclic group; and letter symbols m' and n' are each independently 0 or 1;

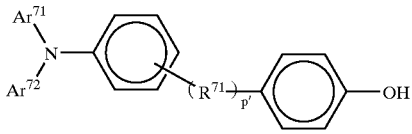
(7)

wherein $R^{71}$ represents a divalent hydrocarbon group having 1 to 8 carbon atoms and which may be branched; $Ar^{71}$ and $Ar^{72}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings may combine to form a ring via $R^{71}$; and a letter symbol p' is 0 or 1;

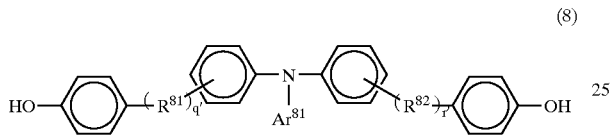
(8)

wherein $R^{81}$ and $R^{82}$ each independently represent a divalent hydrocarbon group having 1 to 8 carbon atoms and which may be branched; $Ar^{81}$ represents a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings linked via $R^{81}$ may combine to form a ring via $R^{81}$; the two benzene rings linked via $R^{82}$ may combine to form a ring via $R^{82}$; and letter symbols q' and r' are each independently 0 or 1;

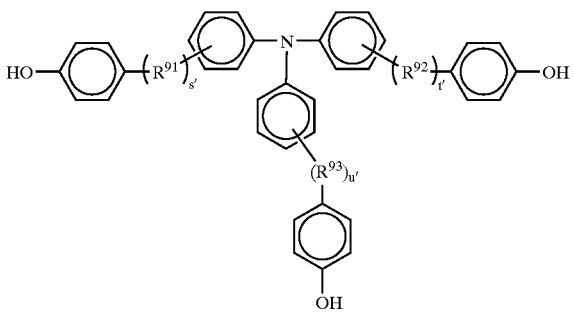
(9)

wherein $R^{91}$ to $R^{93}$ each independently represent a divalent hydrocarbon group having 1 to 8 carbon atoms and which may be branched; the two benzene rings linked via $R^{91}$ may combine to form a ring via $R^{92}$; the two benzene rings linked via $R^{92}$ may combine to form a ring via $R^{92}$; the two benzene rings linked via $R^{93}$ may combine to form a ring via $R^{93}$; letter symbols s', t' and u' are each independently 0 or 1; and

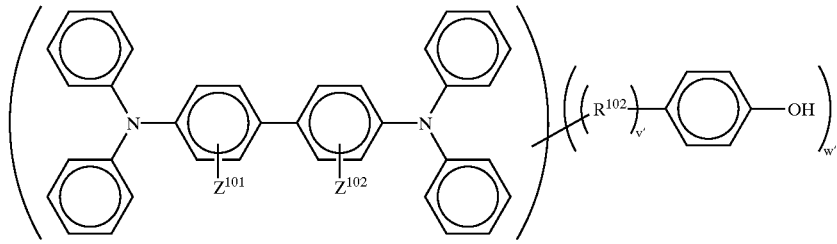
(10)

wherein $R^{102}$ represents a divalent hydrocarbon group having 1 to 8 carbon atoms and which may be branched; $Z^{101}$ and $Z^{102}$ each independently represent a hydrogen atom, a halogen atom, a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the benzene ring having $Z^{101}$ and the benzene ring having $Z^{102}$ may combine via $Z^{101}$ or $Z^{102}$ to form a ring; a letter symbol v' is 0 or 1; and a letter symbol w' is an integer of 1 to 4.

25. The process cartridge according to claim 21, wherein said basic catalyst is an amine catalyst.

26. The process cartridge according to claim 25, wherein said amine catalyst is a tertiary alkylamine.

27. The process cartridge according to claim 21, wherein said basic catalyst is a catalyst containing an alkali metal or a catalyst containing an alkaline earth metal.

28. The process cartridge according to claim 21, wherein said electrophotographic photosensitive member has a pro tective layer on said photosensitive layer, and said surface layer of the electrophotographic photosensitive member is the protective layer.

29. An electrophotographic apparatus comprising an electrophotographic photosensitive member, a charging means, an exposure means, a developing means and a transfer means, wherein;
    said electrophotographic photosensitive member is an electrophotographic photosensitive member comprising a support and provided thereon a photosensitive layer;
    said electrophotographic photosensitive member having a surface layer which contains a cured product of a phenolic compound;
    said phenolic compound having a charge-transportable structure and at least one substituted hydroxyphenyl group having at least one hydroxymethyl group as a substituent.

30. The electrophotographic apparatus according to claim 29, wherein at least one of said at least one substituted hydroxyphenyl group is a substituted p-hydroxyphenyl group.

31. The electrophotographic apparatus according to claim 29, wherein at least one of said at least one hydroxymethyl group is linked at the position which is the o-position in respect to any of the hydroxyl groups of the at least one substituted hydroxyphenyl group having at least one hydroxymethyl group as a substituent.

32. The electrophotographic apparatus according to claim 29, wherein said charge-transportable structure is triarylamine structure.

33. The electrophotographic apparatus according to claim 29, wherein said phenolic compound has structure represented by any one of the following Formulas (1) to (5):

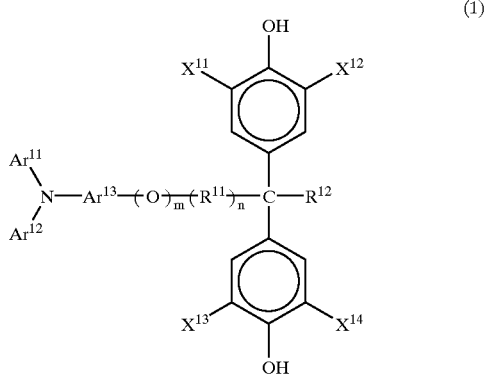

(1)

wherein $R^{11}$ represents a divalent hydrocarbon group having 1 to 8 carbon atoms and which may be branched; $R^{12}$ represents a hydrogen atom, a substituted or unsubstituted alkyl group, a substituted or unsubstituted aralkyl group or a substituted or unsubstituted phenyl group; $Ar^{11}$ and $Ar^{12}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; $Ar^{13}$ represents a substituted or unsubstituted divalent aromatic hydrocarbon ring group or a substituted or unsubstituted divalent aromatic heterocyclic group; letter symbols m and n are each independently 0 or 1; and $X^{11}$ to $X^{14}$ each independently represent a hydrogen atom or a hydroxymethyl group, provided that at least one of $X^{11}$ to $X^{14}$ is a hydroxymethyl group;

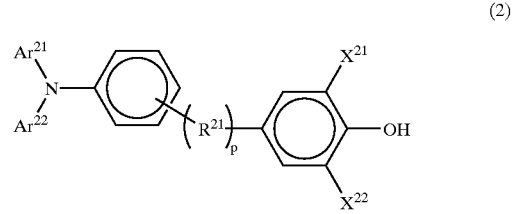

(2)

wherein $R^{21}$ represents a divalent hydrocarbon group having 1 to 8 carbon atoms and which may be branched; $Ar^{21}$ and $Ar^{22}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings may combine to form a ring via $R^{21}$; a letter symbol p is 0 or 1; and $X^{21}$ and $X^{22}$ each independently represent a hydrogen atom or a hydroxymethyl group, provided that at least one of $X^{21}$ and $X^{22}$ is a hydroxymethyl group;

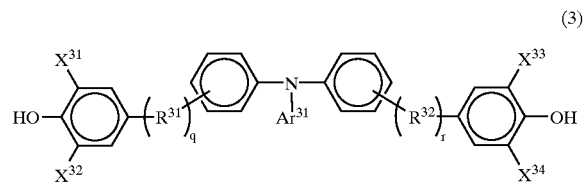

(3)

wherein $R^{31}$ and $R^{32}$ each independently represent a divalent hydrocarbon group having 1 to 8 carbon atoms and which may be branched; $Ar^{31}$ represents a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings linked via $R^{31}$ may combine to form a ring via $R^{31}$; the two benzene rings linked via $R^{32}$ may combine to form a ring via $R^{32}$; letter symbols q and r are each independently 0 or 1; and $X^{31}$ to $X^{34}$ each independently represent a hydrogen atom or a hydroxymethyl group, provided that at least one of $X^{31}$ to $X^{34}$ is a hydroxymethyl group;

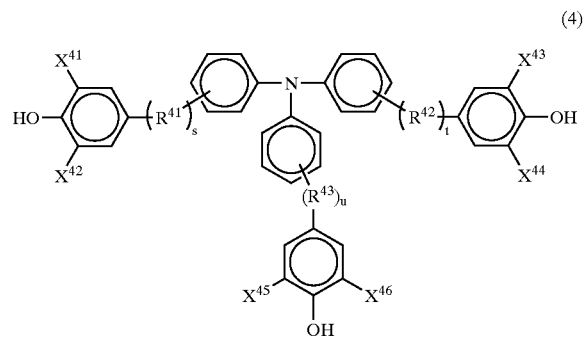

(4)

wherein $R^{41}$ to $R^{43}$ each independently represent a divalent hydrocarbon group having 1 to 8 carbon atoms and which may be branched; the two benzene rings linked via $R^{41}$ may combine to form a ring via $R^{41}$; the two benzene rings linked via $R^{42}$ may combine to form a ring via $R^{42}$; the two benzene rings linked via $R^{43}$ may combine to form a ring via $R^{43}$; letter symbols s, t and u are each independently 0 or 1; and $X^{41}$ to $X^{46}$ each independently represent a hydrogen atom or a hydroxymethyl group, provided that at least one of $X^{41}$ to $X^{46}$ is a hydroxymethyl group; and

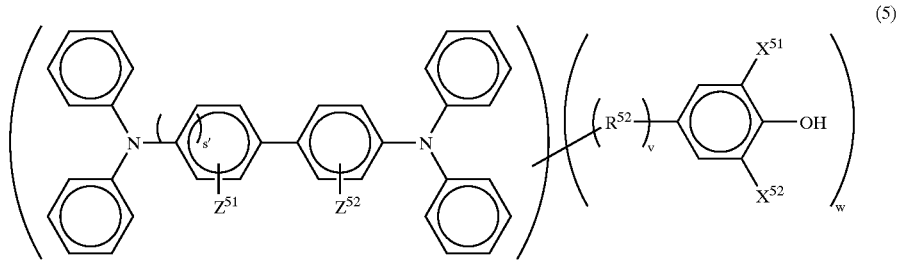
(5)

wherein $R^{52}$ represents a divalent hydrocarbon group having 1 to 8 carbon atoms and which may be branched; $Z^{51}$ and $Z^{52}$ each independently represent a hydrogen atom, a halogen atom, a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the benzene ring having $Z^{51}$ and the benzene ring having $Z^{52}$ may combine via $Z^{51}$ or $Z^{52}$ to form a ring; a letter symbol v is 0 or 1; a letter symbol w is an integer of 1 to 4; and $X^{51}$ and $X^{52}$ each independently represent a hydrogen atom or a hydroxymethyl group, provided that at least one of $X^{51}$ and $X^{52}$ is a hydroxymethyl group.

34. The electrophotographic apparatus according to claim 29, wherein said electrophotographic photosensitive member has a protective layer on said photosensitive layer, and said surface layer of the electrophotographic photosensitive member is the protective layer.

35. An electrophotographic apparatus comprising an electrophotographic photosensitive member, a charging means, an exposure means, a developing means and a transfer means, wherein;

said electrophotographic photosensitive member is an electrophotographic photosensitive member comprising a support and provided thereon a photosensitive layer;

said electrophotographic photosensitive member having a surface layer which contains a cured product of a resol resin obtained by allowing a phenolic compound, to react with formaldehyde in the presence of a basic catalyst;

said phenolic compound having a charge-transportable structure and at least one hydroxyphenyl group; and said resol resin having charge-transportable structure.

36. The electrophotographic apparatus according to claim 35, wherein at least one of said at least one hydroxyphenyl group is a p-hydroxyphenyl group.

37. The electrophotographic apparatus according to claim 35, wherein said charge-transportable structure is triarylamine structure.

38. The electrophotographic apparatus according to claim 35, wherein said phenolic compound having at least one hydroxyphenyl group and charge-transportable structure has structure represented by any one of the following Formulas (6) to (10):

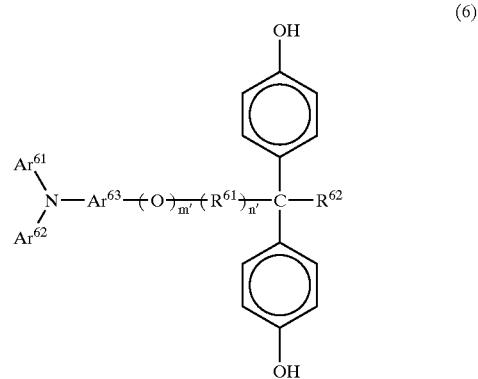
(6)

wherein $R^{61}$ represents a divalent hydrocarbon group having 1 to 8 carbon atoms and which may be branched, $R^{62}$ represents a hydrogen atom, a substituted or unsubstituted alkyl group, a substituted or unsubstituted aralkyl group or a substituted or unsubstituted phenyl group; $Ar^{61}$ and $Ar^{62}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; $Ar^{63}$ represents a substituted or unsubstituted divalent aromatic hydrocarbon ring group or a substituted or unsubstituted divalent aromatic heterocyclic group; and letter symbols m' and n' are each independently 0 or 1;

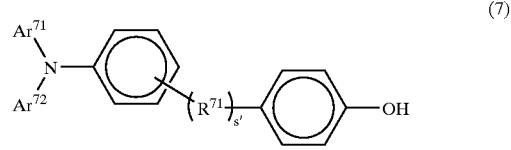
(7)

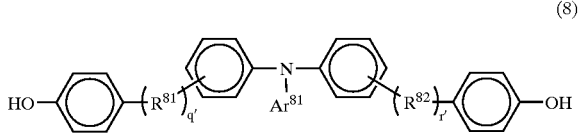
(8)

wherein $R^{71}$ represents a divalent hydrocarbon group having 1 to 8 carbon atoms and which may be branched; $Ar^{71}$ and $Ar^{72}$ each independently represent a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings may combine to form a ring via $R^{71}$; and a letter symbol p' is 0 or 1;

wherein $R^{81}$ and $Ar^{82}$ each independently represent a divalent hydrocarbon group having 1 to 8 carbon atoms and which may be branched; $Ar^{81}$ represents a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the two benzene rings linked via $R^{81}$ may combine to form a ring via $R^{81}$; the two benzene rings linked via $R^{82}$ may combine to form a ring via $R^{82}$; and letter symbols q' and r' are each independently 0 or 1;

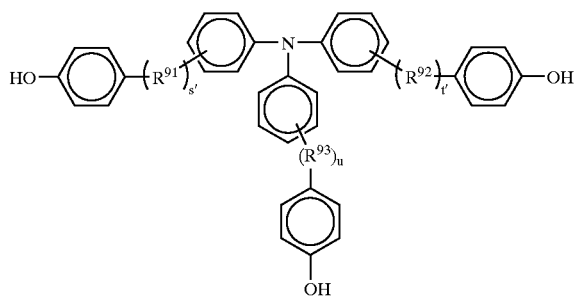

(9)

wherein $R^{91}$ to $R^{93}$ each independently represent a divalent hydrocarbon group having 1 to 8 carbon atoms and which may be branched; the two benzene rings linked via $R^{91}$ may combine to form a ring via $R^{91}$; the two benzene rings linked via $R^{92}$ may combine to form a ring via $R^{92}$; the two benzene rings linked via $R^{93}$ may combine to form a ring via $R^{93}$; letter symbols s', t' and u' are each independently 0 or 1; and wherein $R^{102}$ represents a divalent hydrocarbon group having 1 to 8 carbon atoms and which may be branched; $Z^{101}$ and $Z^{102}$ each independently represent a hydrogen atom, a halogen atom, a substituted or unsubstituted alkyl group, a substituted or unsubstituted aralkyl group, a substituted or unsubstituted monovalent aromatic hydrocarbon ring group or a substituted or unsubstituted monovalent aromatic heterocyclic group; the benzene ring having $Z^{101}$ and the benzene ring having $Z^{102}$ may combine via $Z^{101}$ or $Z^{102}$ to form a ring; a letter symbol v' is 0 or 1; and a letter symbol w' is an integer of 1 to 4.

39. The electrophotographic apparatus according to claim 35, wherein said basic catalyst is an amine catalyst.

40. The electrophotographic apparatus according to claim 39, wherein said amine catalyst is a tertiary alkylamine.

41. The electrophotographic apparatus according to claim 35, wherein said basic catalyst is a catalyst containing an alkali metal or a catalyst containing an alkaline earth metal.

42. The electrophotographic apparatus according to claim 35, wherein said electrophotographic photosensitive member has a protective layer on said photosensitive layer, and

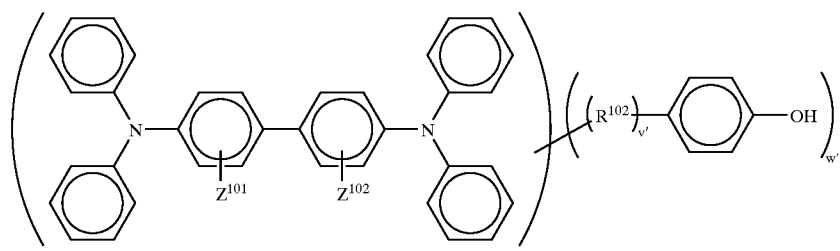

(10)

said surface layer of the electrophotographic photosensitive member is the protective layer.

* * * * *

UNITED STATES PATENT AND TRADEMARK OFFICE
CERTIFICATE OF CORRECTION

PATENT NO. : 6,913,862 B2
DATED : July 5, 2005
INVENTOR(S) : Kouichi Nakata et al.

It is certified that error appears in the above-identified patent and that said Letters Patent is hereby corrected as shown below:

Column 2,
Line 11, "squalic" should read -- squaric --; and
Line 14, "froth" should read -- forth --.

Column 11,
Line 32, "$Z^{52}$" should read -- $Z^{52}$, --.

Column 29,
Line 53, "nothing but very" should be deleted.

Column 32,
Line 3, "come" should read -- be --.

Column 33,
Line 9, "the estimated structure to the last." should read -- believed to be the final structure. --.

Column 37,
Line 20, "an" should be deleted;
Line 37, "2° C." should read -- 20° C. --; and
Line 67, close up right margin.

Column 38,
Line 1, close up left margin.

Column 40,
Line 28, "pre-exposure light" should read -- pre-exposure light 20 --; and
Line 57, "As" should read -- ¶ As --.

Column 41,
Line 33, "1 hours." should read -- 1 hour. --.

Column 44,
Line 29, "formalin (371)" should read -- formalin (37%) --; and
Line 38, "charge-transportable" should read -- charge-transportable structure --.

Column 47,
Line 64, "The" should read -- ¶ The --.

UNITED STATES PATENT AND TRADEMARK OFFICE
CERTIFICATE OF CORRECTION

PATENT NO. : 6,913,862 B2
DATED : July 5, 2005
INVENTOR(S) : Kouichi Nakata et al.

It is certified that error appears in the above-identified patent and that said Letters Patent is hereby corrected as shown below:

Column 57,
Line 25, "wherein;" should read -- wherein: --;
Line 29, "structure and" should read -- structure; and --; and
Line 30, "a" should be deleted.

Column 60,
Line 3, "wherein;" should read -- wherein: --; and
Line 8, "compound," should read -- compound --.

Column 61,
Line 3, "branched," should read -- branched; --.

Column 63,
Line 24, "wherein;" should read -- wherein: --; and
Lines 36, 39 and 45, "claim 15" should read -- claim 15, --.

Column 64,
Line 63, close up right margin.

Column 65,
Line 67, "wherein;" should read -- wherein: --.

Column 66,
Line 9, "having," should be deleted; and
Line 58, "branched," should read -- branched; --.

Column 68,
Line 67, "pro" should read -- pro- --.

Column 69,
Line 6, "wherein;" should read -- wherein: --.

UNITED STATES PATENT AND TRADEMARK OFFICE
CERTIFICATE OF CORRECTION

PATENT NO. : 6,913,862 B2  
DATED : July 5, 2005  
INVENTOR(S) : Kouichi Nakata et al.

It is certified that error appears in the above-identified patent and that said Letters Patent is hereby corrected as shown below:

Column 71,  
Lines 9-17, " 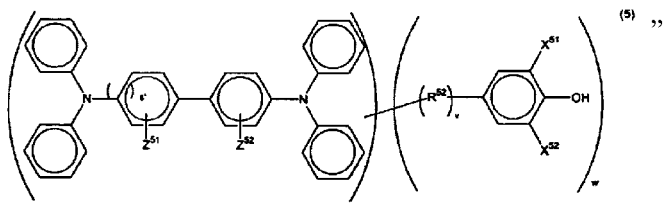 "

should read -- 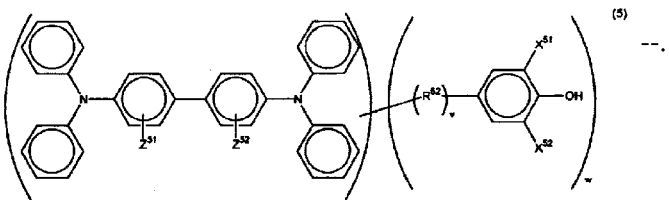 --.

Line 43, "wherein;" should read -- wherein: --; and  
Line 50, "compound," should read -- compound --.

Column 72,  
Line 38, "branched," should read -- branched; --; and

Lines 53-58, " 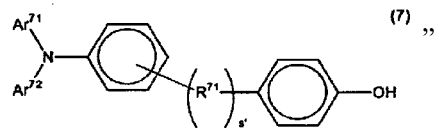 "

should read -- 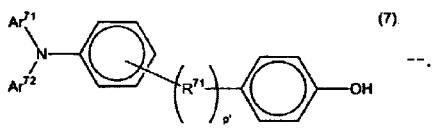 --.

UNITED STATES PATENT AND TRADEMARK OFFICE
CERTIFICATE OF CORRECTION

PATENT NO. : 6,913,862 B2
DATED : July 5, 2005
INVENTOR(S) : Kouichi Nakata et al.

It is certified that error appears in the above-identified patent and that said Letters Patent is hereby corrected as shown below:

Column 73,
Line 11, "$Ar^{82}$" should read -- $R^{82}$ --; and

Lines 26-37, " 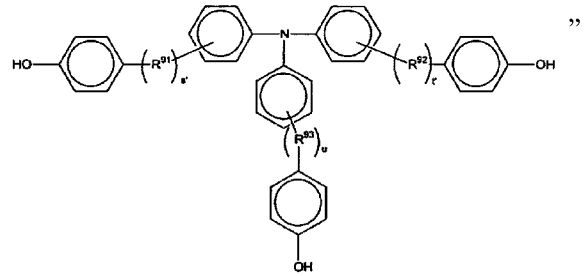 "

should read -- 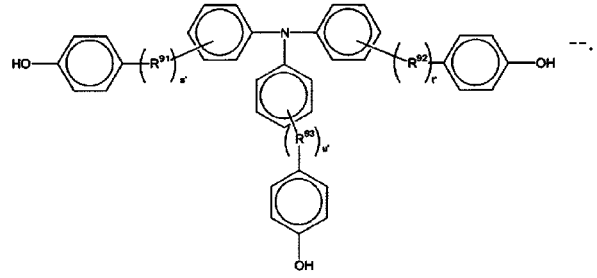 --.

Signed and Sealed this

Seventeenth Day of January, 2006

JON W. DUDAS
*Director of the United States Patent and Trademark Office*